(12) United States Patent
Venkatasubramanian et al.

(10) Patent No.: US 9,535,965 B2
(45) Date of Patent: Jan. 3, 2017

(54) SYSTEM AND METHOD FOR SPECIFYING METADATA EXTENSION INPUT FOR EXTENDING DATA WAREHOUSE

(75) Inventors: Raghuram Venkatasubramanian, Cupertino, CA (US); Roger Bolsius, Round Rock, TX (US); Harvard Pan, Boston, MA (US); Alextair Mascarenhas, Foster City, CA (US); Saugata Chowdhury, Sunnyvale, CA (US); Venugopal Surendran, Santa Clara, CA (US); Ananth Venkata, San Ramon, CA (US); Jacques Vigeant, Fort Lauderdale, FL (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 13/100,248

(22) Filed: May 3, 2011

(65) Prior Publication Data

US 2011/0295791 A1 Dec. 1, 2011

Related U.S. Application Data

(60) Provisional application No. 61/349,739, filed on May 28, 2010.

(51) Int. Cl.
 *G06F 17/30* (2006.01)
(52) U.S. Cl.
 CPC .............................. *G06F 17/30563* (2013.01)
(58) Field of Classification Search
 CPC ................ G06F 17/30; G06F 17/30241; G06F 17/30286; G06F 17/246; G06F 17/30563; G06F 7/42

USPC .......................... 707/E17.018, 999.003, 802, E17.014,707/620, 694, 770, E17.002, E17.005, E17.03,707/E17.032, E17.044, 600, 736, 769, 966,707/999.101, 999.104, 999.107, 602
See application file for complete search history.

(56) References Cited

U.S. PATENT DOCUMENTS

| | | | |
|---|---|---|---|
| 6,012,066 A * | 1/2000 | Discount et al. | |
| 6,078,925 A | 6/2000 | Anderson | |
| 6,594,672 B1 | 7/2003 | Lampson | |
| 6,604,110 B1 | 8/2003 | Savage | |
| 6,970,874 B2 | 11/2005 | Egilsson et al. | |
| 7,089,266 B2 | 8/2006 | Stolte et al. | |
| 7,275,024 B2 | 9/2007 | Yeh et al. | |
| 7,318,216 B2 | 1/2008 | Diab | |
| 7,350,191 B1 | 3/2008 | Kompella | |
| 7,401,064 B1 | 7/2008 | Arone et al. | |
| 7,676,478 B2 | 3/2010 | Rausch | |
| 7,720,803 B2 | 5/2010 | Unnebrink et al. | |
| 7,779,036 B2 | 8/2010 | Subramanian et al. | |

(Continued)

*Primary Examiner* — Usmaan Saeed
*Assistant Examiner* — Amanda Willis
(74) *Attorney, Agent, or Firm* — Tucker Ellis LLP

(57) ABSTRACT

An input extension specification can be generated, via an administration tool on a business intelligence (BI) server, for an extender associated with a data warehouse in order to extend the data warehouse. The administration tool can request for data flow information of the data warehouse from the extender. The data flow information indicates the mapping relationship between one or more source data objects and one or more target tables in the data warehouse. The administration tool further allows a user to select said one or more target tables in the data warehouse to be extended based on the data flow information, and builds the input extension specification for the extender.

20 Claims, 5 Drawing Sheets

(56) References Cited

U.S. PATENT DOCUMENTS

| | | |
|---|---|---|
| 7,783,711 B2 | 8/2010 | LeVasseur et al. |
| 8,086,598 B1 | 12/2011 | Lamb et al. |
| 8,099,392 B2 | 1/2012 | Paterson et al. |
| 8,433,673 B2 * | 4/2013 | Venkatasubramanian ............ G06F 17/30563 706/46 |
| 2002/0194167 A1 | 12/2002 | Bakalash et al. |
| 2003/0229610 A1 | 12/2003 | Van Treeck |
| 2004/0083199 A1 | 4/2004 | Govindugari et al. |
| 2004/0139061 A1 | 7/2004 | Colossi et al. |
| 2005/0033726 A1 | 2/2005 | Wu et al. |
| 2005/0065939 A1 | 3/2005 | Miao |
| 2005/0187930 A1 | 8/2005 | Subramanian et al. |
| 2005/0203931 A1 | 9/2005 | Pingree et al. |
| 2006/0059028 A1 | 3/2006 | Eder |
| 2006/0101017 A1 | 5/2006 | Eder |
| 2006/0112123 A1 * | 5/2006 | Clark et al. .................. 707/101 |
| 2006/0271528 A1 | 11/2006 | Gorelik |
| 2007/0005713 A1 | 1/2007 | LeVasseur et al. |
| 2007/0174308 A1 * | 7/2007 | Rausch ....................... 707/100 |
| 2007/0198972 A1 | 8/2007 | Hogg |
| 2007/0214111 A1 | 9/2007 | Jin et al. |
| 2007/0255741 A1 | 11/2007 | Geiger et al. |
| 2008/0027769 A1 | 1/2008 | Eder |
| 2008/0115135 A1 | 5/2008 | Behnen et al. |
| 2008/0140692 A1 | 6/2008 | Gehring |
| 2009/0018996 A1 * | 1/2009 | Hunt et al. ......................... 707/2 |
| 2009/0083652 A1 | 3/2009 | Krasner et al. |
| 2010/0088669 A1 | 4/2010 | Cwalina et al. |
| 2010/0106672 A1 | 4/2010 | Robson et al. |
| 2011/0004617 A1 | 1/2011 | Mineno |
| 2013/0066826 A1 * | 3/2013 | McDonald ........ G06F 17/30563 707/602 |

* cited by examiner

```xml
<?xml version="1.0"?>
<Document>
  <containermappings>
    <containermapping>
      <admincontainer name="Admin:ExtensionWH" type="Extension" />

<generaltablecontainer name="EXTENSIONWH" />

<dimensiondatastorecontainer name="EXTENSIONWH" />
      <dimensionstagingdatastorecontainer name="EXTENSIONWH" />

<dimensionsequencecontainer name="SILOS" />

<dimensionloadinterfacecontainer name="SILOS/Extensions" />
      <dimensionloadknowledgemodulecontainer name="SILOS" />
      <dimensionloadpackagecontainer name="SILOS/Extensions" />

<dimensionextractinterfacecontainer name="SDE_FUSIONAPPS/Extensions" />
      <dimensionextractknowledgemodulecontainer name="SDE_FUSIONAPPS" />
      <dimensionextractpackagecontainer name="SDE_FUSIONAPPS/Extensions" />

<factdatastorecontainer name="EXTENSIONWH" />
      <factstagingdatastorecontainer name="EXTENSIONWH" />

<factsequencecontainer name="SILOS" />

<factloadinterfacecontainer name="SILOS/Extensions" />
      <factloadknowledgemodulecontainer name="SILOS" />
      <factloadpackagecontainer name="SILOS/Extensions" />

<factextractinterfacecontainer name="SDE_FUSIONAPPS/Extensions" />
      <factextractknowledgemodulecontainer name="SDE_FUSIONAPPS" />
      <factextractpackagecontainer name="SDE_FUSIONAPPS/Extensions" />
    </containermapping>

<containermapping>
      <admincontainer name="Admin:PackagedWH" type="Packaged" />
    </containermapping>

<containermapping>
      <admincontainer name="Admin:FusionApps" type="Oltp" />
    </containermapping>

</containermappings>
</Document>
```

401 — first containermapping block
402 — second containermapping block
403 — third containermapping block

Figure 4

SYSTEM AND METHOD FOR SPECIFYING
METADATA EXTENSION INPUT FOR
EXTENDING DATA WAREHOUSE

CLAIM OF PRIORITY

This application claims priority to the following application, which is hereby incorporated by reference in its entirety: U.S. Provisional Application No. 61/349,739, entitled "SYSTEM AND METHOD FOR PROVIDING DATA FLEXIBILITY IN A BUSINESS INTELLIGENCE SERVER", filed on May 28, 2010.

CROSS REFERENCE TO RELATED APPLICATIONS

This application is related to the following applications which are incorporated herein by reference:

U.S. patent application Ser. No. 12/711,269 entitled "GENERATION OF STAR SCHEMAS FROM SNOWFLAKE SCHEMAS CONTAINING A LARGE NUMBER OF DIMENSIONS," by Samir Satpathy et al., filed on Feb. 24, 2010.

U.S. patent application Ser. No. 13/100,245, entitled "SYSTEM AND METHOD FOR PROVIDING DATA FLEXIBILITY IN A BUSINESS INTELLIGENCE SERVER USING AN ADMINISTRATION TOOL" by Raghuram Venkatasubramanian et al., filed on May 3, 2011.

U.S. patent application Ser. No. 13/100,249, entitled "SYSTEM AND METHOD FOR SUPPORTING DATA WAREHOUSE METADATA EXTENSION USING AN EXTENDER" by Raghuram Venkatasubramanian et al., filed on May 3, 2011.

U.S. patent application Ser. No. 13/100,255, entitled "SYSTEM AND METHOD FOR ENABLING EXTRACT TRANSFORM AND LOAD PROCESSES IN A BUSINESS INTELLIGENCE SERVER" by Raghuram Venkatasubramanian et al., filed on May 3 2011.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The present invention generally relates to data warehouses and business intelligence, and particularly to supporting data flexibility for a business intelligence (BI) server.

BACKGROUND

In the context of computer software, and particularly computer databases, the term "data warehouse" is generally used to refer to a unified data repository for all customer-centric data. A data warehouse environment tends to be quite large. The data stored in the data warehouse can be cleaned, transformed, and catalogued. Such data can be used by business professionals for performing business related operations, such as data mining, online analytical processing, and decision support. Typically, a data warehouse can be associated with extract, transform, and load (ETL) processes and business intelligence tools. The ETL processes are capable of extracting data from source systems and bringing the data into a data warehouse. The business intelligence tools are designed to report, analyze and present data stored in the data warehouse. This is the general area that embodiments of the invention are intended to address.

SUMMARY

In accordance with an embodiment, an input extension specification can be generated, via an administration tool on a business intelligence (BI) server, for an extender associated with a data warehouse in order to extend the data warehouse. The administration tool can request for data flow information of the data warehouse from the extender. The data flow information indicates the mapping relationship between one or more source data objects and one or more target tables in the data warehouse. The administration tool further allows a user to select said one or more target tables in the data warehouse to be extended based on the data flow information, and builds the input extension specification for the extender.

BRIEF DESCRIPTION OF THE FIGURES

FIG. 4 illustrates exemplary container mapping configuration information for supporting data flexibility in accordance with an embodiment.

DETAILED DESCRIPTION

Figure 1:
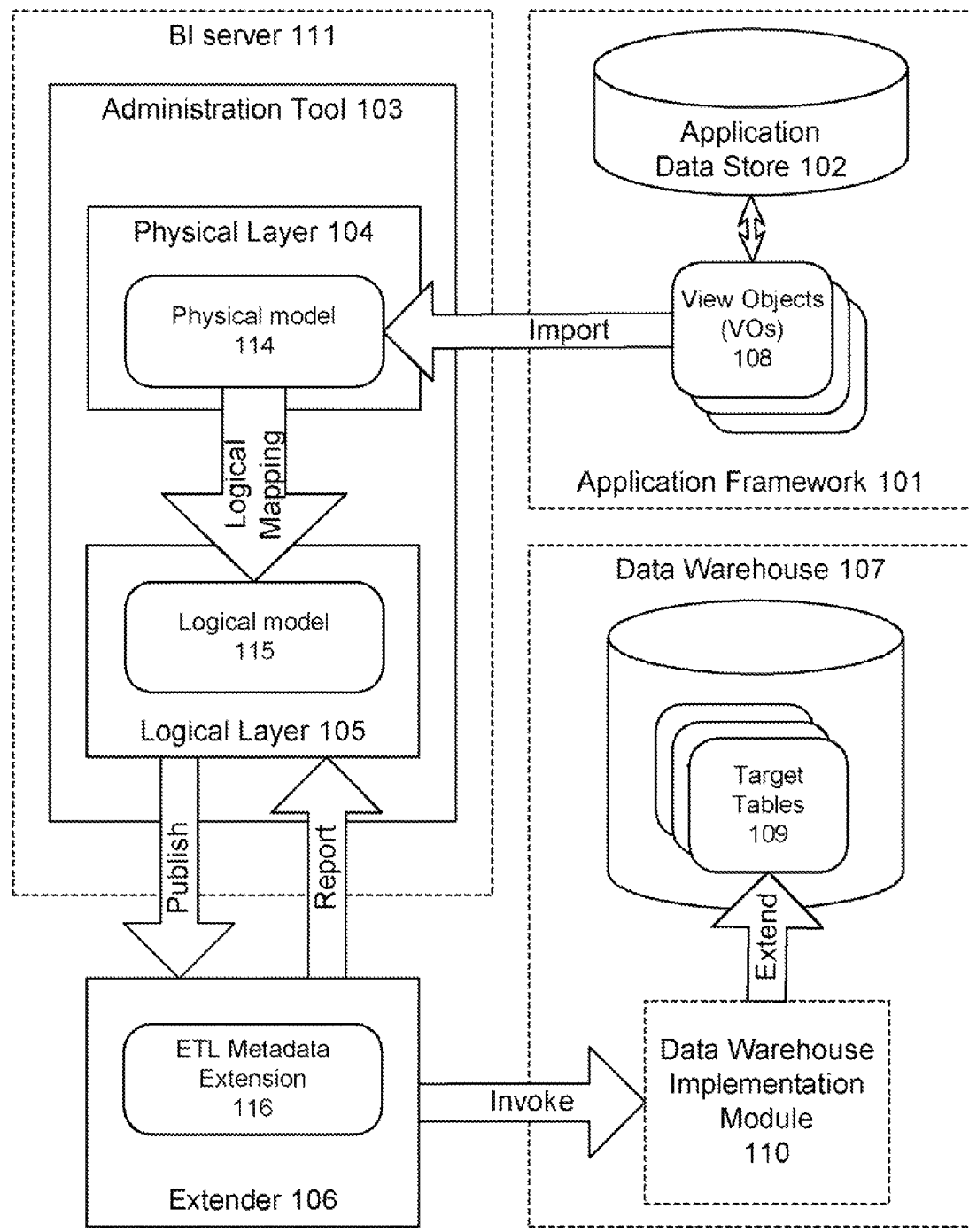
FIG. 1 illustrates an exemplary view of the data flow from an application framework to a data warehouse in accordance with an embodiment.

The present invention is illustrated, by way of example and not by way of limitation, in the figures of the accompanying drawings in which like references indicate similar elements. It should be noted that references to "an" or "one" or "some" embodiment(s) in this disclosure are not necessarily to the same embodiment, and such references mean at least one. The description of the embodiments of the invention as following uses the Oracle Database Integrator (ODI) data warehouse and Informatica (INFA) data warehouse as examples for data warehouse platform. It will be apparent to those skilled in the art that other types of data warehouse platform can be used without limitation. The description of the embodiments of the invention as following uses the Oracle Application Development Framework (ADF) as examples for application framework. It will be apparent to those skilled in the art that other types of application framework can be used without limitation.

As described herein, a data warehouse can be used to store critical business information. Business intelligence (BI) applications running on top of the data warehouse can provide powerful tools to the users for managing and operating their business. These BI tools can not only help the users run their day-to-day business, but also help the users make critical tactical, or even long term strategic, business decisions.

There can be different types of BI applications used in the enterprise environment, such as sales, marketing, supply chain, financial, and human resource applications. An application framework, such as ADF, can be used to implement the different types of BI applications. Each BI application can store and use one or more application data objects in its own application data store, outside of the data warehouse.

A BI server can reside between the BI applications and the data warehouse. The BI server allows the BI applications to use high-level analytical queries to scan and analyze large volumes of data in the data warehouse using complex formulas, in order to provide efficient and easy access to information required for business decision making. The BI applications can rely on the BI server to fulfill its analytic requirement.

A data warehouse can be sourced from multiple data source systems associated with the BI applications. As such, a BI server can associate an entity in the target data warehouse with data objects from multiple data sources, by extracting data from the various data sources into a single staging area, where the data conformance is performed before the conformed data can be loaded into the target data warehouse.

Furthermore, when BI applications make changes, or extensions, on the application data objects in application data store. The BI server can propagate the changes and the extensions on the application objects in the application framework to the underlying data warehouse that stores the data in the application objects.

The BI server uses extract, transform, and load (ETL) processes to extract data from the outside data sources, transform the source data to fit operational needs, and load the data into the target data warehouse. ETL metadata can be used to define and manage the ETL processes associated with the data warehouse. Such metadata are essential to the data warehouse and the BI systems on top of the data warehouse. An administration tool on the BI server allows a user to interact with the BI server, and manage the extension process of the underlying data warehouse through metadata.

FIG. 1 illustrates an exemplary view of the data flow from an application framework to a data warehouse in accordance with an embodiment. As shown in FIG. 1, one or more application data objects, such as view objects (VOs) 108 that are associated with the data in the application data store 102, can be used in an application framework 101, such as an application development framework (ADF). In an embodiment, the VOs can have a query that fetches a record from an application data store. In another embodiment, the VOs can contain implementation logic which is used to manipulate the data fetched by the VO query.

An administration tool 103, provided by a BI server 111, includes a physical layer 104 and a logical layer 105. The physical layer of the administration tool defines the data sources, to which the BI server 111 submits queries. The physical layer includes a physical model 114 that defines the relationships between the physical source databases and other data sources that are used to process multiple data source queries. The logical layer of the administration tool captures business, or logical, model of the data. The logical layer uses a logical data model 115 that defines the data in a data warehouse 107 in detail, without regard to how they are physical implemented in the database.

The administration tool allows the VOs to be imported from the application framework into the physical model based on related metadata. Then, the updated physical model in the physical layer can be mapped to the logical model in the logical layer within the BI server administration tool.

The administration tool can detect changes in the VOs and publish these changes to a backend extender 106 associated with the data warehouse. The extender can make changes to ETL metadata before applying the changes to the target tables 109 in the underlying data warehouse. The ETL metadata can include information on data transformation logics, data manipulation language (DML) options and target/source table. The backend extender can generate one or more metadata extensions 116 based on changes in the VOs. The metadata extensions include detail metadata changes that can be used by the extender to extend the data warehouse.

Also as shown in FIG. 1, the ETL metadata extensions can be relayed from the extender back to the administration tool. The administration tool can then update the logical model, physical model, and related metadata, and allow the extender to extend the data warehouse.

In an embodiment, the extender can invoke an implementation module 110 that is associated with the data warehouse to make physical changes on the target tables in the data warehouse. Since the implementation and internal structure of the data warehouse varies, different implementation modules can be invoked by the extender for extending different data warehouses. Furthermore, the implementation module can be provided by a particular underlying data warehouse, so that the implementation module can have access to the target tables from within the data warehouse.

Figure 2:
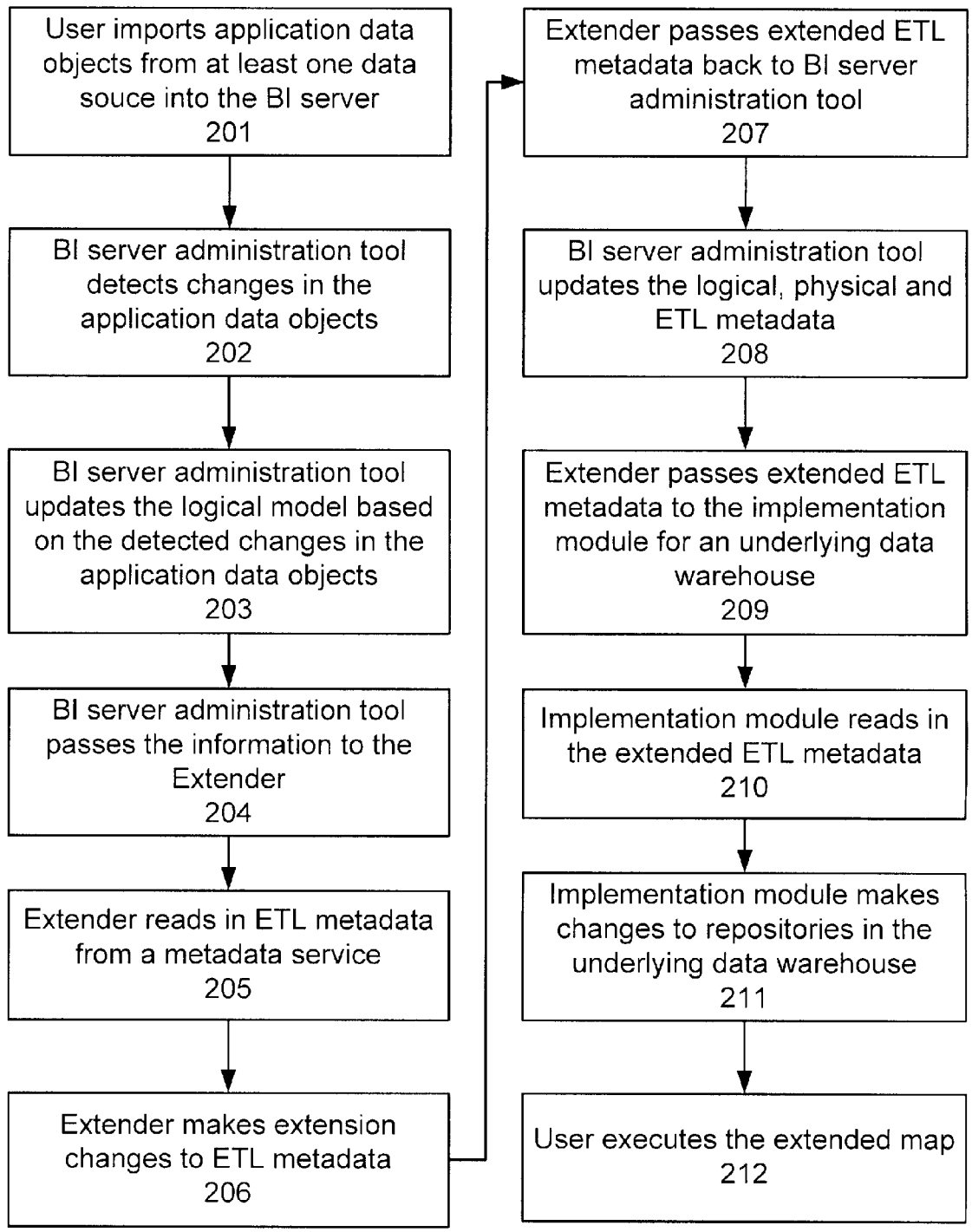
FIG. 2 illustrates an exemplary work flow for supporting data flexibility in a business intelligence server associated with a data warehouse in accordance with an embodiment.

FIG. 2 illustrates an exemplary work flow for supporting data flexibility in a business intelligence server associated with a data warehouse in accordance with an embodiment. As shown in FIG. 2, a user can first import application data objects from the application framework into a physical model in the logical layer, via the BI server administration tool, at step 201. The BI server administration tool can detect changes in the application data objects, at step 202, and updates the logical model in the logical layer based on the detected changes in the application data objects, at step 203. Then, the BI server administration tool can pass the information to the extender, at step 204. Since the imported information from the application framework may not be sufficient, the extender can read in ETL metadata from a metadata service (MDS), at step 205. Then, the extender can make extensions to the ETL metadata at step 206, and passes the extended information back to the administration tool at step 207. After the BI server administration tool updates the logical model, physical model and ETL metadata, at step 208, the extender passes the extended ETL metadata to a data warehouse implementation module to update the data warehouse, at step 209. Finally, the data warehouse implementation module can read in the extended ETL metadata, at step 210, and make changes to the data repositories, at step 211, before a user can execute the extended maps, at step 212.

Interaction Between the Administration Tool and the Backend ETL Extender

In accordance with an embodiment, data flexibility can be supported using a business intelligence (BI) server associated with a data warehouse. An extender associated with the data warehouse can send data flow information for the data warehouse to an administration tool provided by the BI server. The data flow information indicates the mapping relationship between one or more source data objects and one or more target tables in the data warehouse. The administration tool further allow a user to select said one or more target tables in the data warehouse to be extended based on the data flow information, and build an input extension specification for the extender to extend the data warehouse.

In accordance with an embodiment, the backend ETL extender takes an input from the administration tool, and returns an output to the administration tool. The input specification contains the information on one or more data objects to be extended, and joins and mappings that are desired. The input specification allows the administration tool to pass one or more identified ETL changes to the backend extender. In an embodiment, the input specification can be in XML format. The output document contains information on the tables created or modified or searched. The output document also contains the columns, keys and references information, which information can be used by the administration tool to make changes to the repository model.

Figure 3:
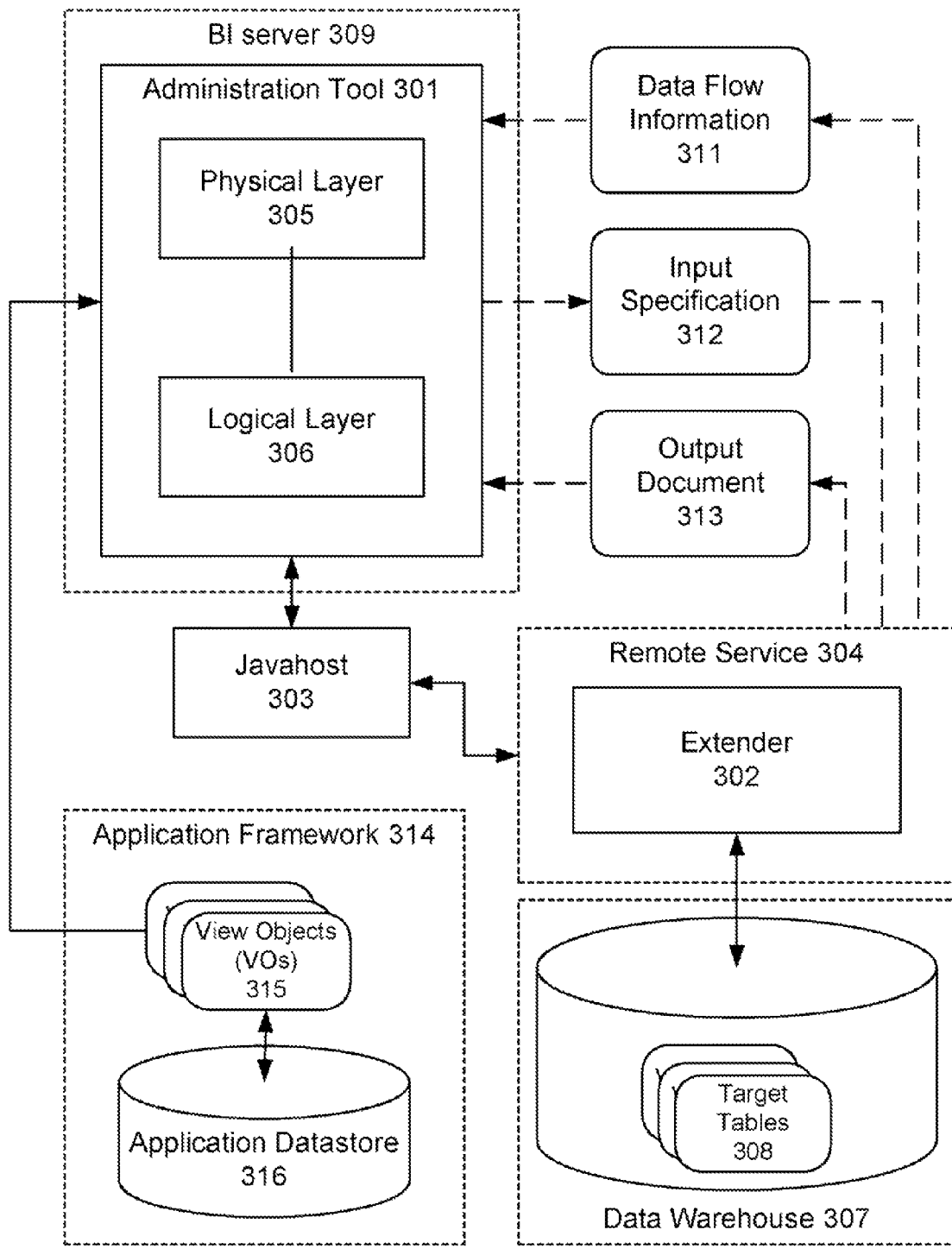
FIG. 3 illustrates an exemplary view of the interaction between the administration tool and an extender for a data warehouse in accordance with an embodiment.

The administration tool can interact with the backend ETL extender using different connection mechanisms. FIG. 3 illustrates an exemplary view of the interaction between the administration tool and an extender for a data warehouse in accordance with an embodiment. As shown in FIG. 3, an administration tool 301 on a BI server 309 includes a physical layer 305 and a logical layer 306. To establish the connection, the administration tool can communicate with the extender 302 via a Java host 303. In an embodiment, both the physical layer and a logical layer in the administration tool can be implemented in C++ code, while the extender can be implemented in Java code. The Java host can use remote method invocation (RMI) to glue together the C++ layer and the Java interfaces. In an embodiment, the Java host can sit on the same machine that the administration tool is running on.

In accordance with an embodiment, in order for the administration tool to pass information to the extender, the administration tool can make a call to a remote service 304 that is a wrapper of the extender. Then, the administration tool can send the description of the extension as input parameters of a function call. When the connection is established, the description of the extension can be sent to the extender. The input parameters can be described in the extender interface. In an embodiment, these function calls, which are sent through the Java host layer, can be received by a Java client. The Java client can then accept the input parameters and make the actual calls to the Extender.

In accordance with an embodiment, before the administration tool can actually send any extension information to the extender, the administration tool does a handshake with the extender first to obtain the data flow lineage, or dependency, information for a target data warehouse 307. These data flow information 311 indicates the mapping relationship between source data objects, such as VOs 315 associated with an application data store 316 in an application framework 314, and the target tables 308 in the data warehouse. These data flow information also indicates to the user which target table in the data warehouse can be extended for the VOs. The extender can obtain and store the data flow lineage information for an associated target data warehouse, and provide the data flow information to the administration tool once requested.

The administration tool is capable of generating the extension input specification 312 for the backend extender based on information such as the extension metadata structures and what the extender is expecting as input. In an embodiment, the administration tool can use an XSL transformation to transform the administration tool output into an input specification that is in a format that is acceptable to the extender.

Appendix A shows an exemplary XSL transformation that can transform the administration tool output into an extender input specification in accordance with an embodiment.

After a connection is established between the administration tool and the backend extender, the administration tool can invoke the methods provided by the extender to implement the extension with the help from a reader of the input specification document. In accordance with an embodiment, the extender can perform a runExtension function call that takes an input specification document, such as an extensionDimentsionInputDocument, as an input parameter. The runExtensions function call can commit the changes to the underlying data warehouse.

Once the extensions are complete, output document 313 can be fetched from the backend extender to the administration tool. In an embodiment, the output document contains information on the target tables involved and additional information on the columns, keys and references. This information can be used by the administration tool to modify the physical repository model.

An output document can be generated by the getExtensionOutputDocument function provided by the ETL extender instance. The administration tool 301 can then use the information in the output document to make changes to dimension structures in physical repository model. Additionally, the ETL extender can have a close( )method, which is called only after all operations with the ETL extender are done. Once close( )method is called, the same extender may not be re-used, and a new extender is instantiated if needed.

Connection Document

In accordance with an embodiment, the ETL extender can be initiated and created from the BI server administration tool, based on a connection document and the ETL extender target type. The connection document contains related connection information for different underlying data warehouse.

A sample connection document for an ODI data warehouse can be as shown as Listing 1:

Listing 1

```
<?xml version="1.0"?>
 <Document>
    <parameter name="MasterDriver"
    value="oracle.jdbc.OracleDriver" />
    <parameter name="MasterUrl"
    value="jdbc:oracle:thin:@localhost:1521:XE" />
    <parameter name="MasterUserName" value="odi_master_poc" />
    <parameter name="MasterPassword" value="password" />
    <parameter name="WorkRepositoryName"
    value="ODI_WORK_POC" />
    <parameter name="OdiUsername" value="SUPERVISOR" />
    <parameter name="OdiPassword" value="password" />
 </Document>
```

The above ODI connection document contains ODI data warehouse connection information, such as the master driver, the master URL, the master user name, and the master password.

Another sample connection document can be provided for an INFA data warehouse. An INFA data warehouse connection document includes three sets of connection information: INFA SDK Connection information, INFA DB Connection information, and DAC Connection information. The following Listing 2 is an example for an INFA data warehouse connection document:

Listing 2

```
<?xml version=1.0?>
<Document>
    <SDKConnection>
        <parameter name="Repository" value="Informatica861" />
        <parameter name="DomainName" value="Domain_localhost" />
        <parameter name="Username" value="Administrator" />
        <parameter name="Password" value="Administrator" />
        <parameter name="PCClientInstallPath"
value=
"C:\\Informatica\\PowerCenter8.6.1\\CMD_Utilities\\PC\\server\\bin" />
    </SDKConnection>
    <DBConnection>
        <parameter name="Repository" value="Informatica861" />
        <parameter name="DriverString"
        value="oracle.jdbc.driver.OracleDriver" />
        <parameter name="URL"
        value="jdbc:oracle:thin:@localhost:1521:XE" />
        <parameter name="Username" value="Informatica861" />
        <parameter name="Password" value="password" />
    </DBConnection>
    <DACSDKConnection>
        <parameter name="Container" value="TestContainer" />
        <parameter name="PrimarySourceConnection"
        value="DBConnection_OLTP" />
        <parameter name="PrimaryTargetConnection"
        value="DBConnection_OLAP" />
        <parameter name="DriverString"
        value="oracle.jdbc.driver.OracleDriver" />
        <parameter name="URL"
        value="jdbc:oracle:thin:@localhost:1521:XE" />
        <parameter name="Username" value="dac" />
        <parameter name="Password" value="password" />
        <parameter name="DBType" value="Oracle" />
    </DACSDKConnection>
</Document>
```

In the above example, DBConnection, which defines database connection, can be specified in different ways, as shown in Listing 3 below:

Listing 3

```
1) Using URL
    <DBConnection>
        <parameter name="Repository" value="Informatica861" />
        <parameter name="DriverString"
        value="oracle.jdbc.driver.OracleDriver" />
        <parameter name="URL"
        value="jdbc:oracle:thin:@localhost:1521:XE" />
        <parameter name="Username" value="Informatica861" />
        <parameter name="Password" value="password" />
    </DBConnection>
2) Using ODBC DSN
    <DBConnection>
        <parameter name="Repository" value="Informatica861" />
        <parameter name="DSNName" value="Informatica861" />
        <parameter name="Username" value="Informatica861" />
        <parameter name="Password" value="password" />
    </DBConnection>
3) Using hostname, port and DB Name, if the DB is Oracle
    <DBConnection>
        <parameter name="Repository" value="Informatica861" />
        <parameter name="Hostname" value="localhost" />
        <parameter name="Port" value="1521" />
        <parameter name="DBName" value="XE" />
        <parameter name="Username" value="Informatica861" />
        <parameter name="Password" value="password" />
    </DBConnection>
```

Container Mapping

Data flexibility can be supported among multiple warehouses with different versions and multiple sources with different versions. The objects can be repeated in all these different warehouses. Also, the data warehouse allows users to place different objects in any models and the interfaces and packages in any projects and folders. For example, a user may place all dimension data stores in one model, facts in another model and staging table in a third model, while a different user may elect to place all warehouse objects in the same model.

In accordance with an embodiment, when extensions are specified, a user can decide in which warehouse the user want to make the changes. The scope of extensions can be restricted to registered containers, using a container-mapping configuration.

FIG. 4 illustrates exemplary container mapping configuration information for supporting data flexibility in accordance with an embodiment. As shown in FIG. 4, the container mapping configuration information can be contained in a container mapping configuration file. The container mapping configuration file can be an XML file. The container mapping configuration information can be contained in multiple container mappings 401, 402, and 403. Each container mapping can be associated with a name attribute and a type attribute. For example, container mapping 401 is given a name of "Admin:ExtensionWH" with a type of "Extension."

The container mapping can be pre-built and shipped to an end user's site. The end user does not have to know about this file. The repositories and folders mentioned in this container mapping can be pre-determined.

Data Flow Information

In accordance with an embodiment, there can be two methods to provide data flow lineage or dependency information to a user at the administration tool. As shown in Listing 4, one method is a push dependency method and another method is a pull push dependency method.

Listing 4

```
public Document
    getPullDataStoreDependency(Document targetDataStoreDocument)
public Document
    getPushDataStoreDependency(Document sourceDataStoreDocument)
```

The push dependency method can take a source data store document as input, track the flow from the source object defined in the source data store document towards the target objects, and output a pull data store dependency document. The following Listing 5 is a sample input source data store document that contains information on what is sent to the extender in asking for the data lineage information.

Listing 5

```
<?xml version="1.0"?>
    <Document>
        <datastore name="ADF_REVENUE_VO" type="Oltp"
        container="Admin:FusionApps" />
    </Document>
```

The extender can look in the mappings and return the dependency listing of the objects that can be extended. In an embodiment, the output data flow dependency document from the extender can be an XML file. This dependency information allows the user to see the dependencies in the data warehouse.

The following Listing 6 is a sample output data flow document that shows data flow lineage or dependency information.

Listing 6

```xml
<?xml version="1.0" encoding="UTF-8" standalone="no"?>
<Document>
    <dependency>
        <sourcedatastore container="FUSIONAPPS"
        name="ADF_REVENUE_VO"
            position="Source" type="Oltp"/>
        <targetdatastore container="PACKAGEDWH"
        name="W_REVENUE_F"
            position="Base" type="Fact"/>
    </dependency>
    <dependency>
        <sourcedatastore container="PACKAGEDWH"
        name="W_REVENUE_F"
            position="Base" type="Fact"/>
        <targetdatastore container="PACKAGEDWH"
        name="W_REVENUE_DERIVED_F"
            position="Derived" type="Fact"/>
    </dependency>
    <dependency>
        <sourcedatastore container="PACKAGEDWH"
        name="W_REVENUE_DERIVED_F"
            position="Derived" type="Fact"/>
        <targetdatastore container="PACKAGEDWH"
        name="W_REVENUE_SUMMARY_F"
            position="Derived" type="Fact"/>
    </dependency>
</Document>
```

The above XML output from the extender tells a user that the ADF_REVENUE_VO can cause the W_REVENUE_F table in the data warehouse to be extended. Additionally, the dependency information indicates that W_REVENUE_DERIVED_F table depends on W_REVENUE_F, and W_REVENUE_SUMMARY_F table depends on W_REVERUE_DERIVED_F table. These tables can be displayed to the user for selection. In an embodiment, one cannot uncheck W_REVENUE_F and check W_REVENUE_DERIVED_F to extend, since W_REVENUE_DERIVED_F table depends on W_REVENUE_F. But one can check W_REVENUE_F and uncheck W_REVENUE_DERIVED_F. Additionally, the position field, contained in both <sourcedatastore> and <targetdatastore> tags, is a guide to distinguish the base objects from derived objects. In the above example, the base object is the main or central object when specifying the extension input.

In accordance with an embodiment, the pull dependency method can take a target data store document as input, get the data flow from all the sources that eventually result in the specified object defined in the target data store document, and output a push data store dependency document. A sample input target data store document is shown in Listing 7 below.

Listing 7

```xml
<?xml version="1.0"?>
<Document>
    <datastore name="W_REVENUE_F "
    type="Fact" container="Admin:Extension" />
</Document>
```

The extender can then look in the mappings and return the dependency listing of the objects that can be extended, in a similar manner as the push dependency method. This information can be used to subsequently build input specification document for the extender.

Support Data Extensions using Flexfields

In accordance with an embodiment, a BI server can support data extensions in applications through "flexfields," which are columns within tables that can be repurposed/reused based on a user specified context. There can be different types of extensions for different types of flexfields, Key (KFF) flexfields and Descriptive (DFF) flexfields. In an embodiment, the business intelligence server expects that the KFF segments comes in as new dimensions joined to an existing fact table, and the DFF segments comes in as new attributes on both facts and dimensions on existing tables.

In the extender input specification, metadata extensions can be done in a two-step process: first, the extensions are specified for dimensions; then, the extensions are specified for facts. For example, if the administration tool specifies the extensions for flex based dimensions, the output document by the extender can give the administration tool information on the warehouse dimensions created and modified. The administration tool can then use this information to specify extension information for facts.

Dimensions and facts can be mixed in the input specification for the extender. In accordance with an embodiment, specifications for key and descriptive flex can be separate, even if for the same data object. For example, if a revenue fact has a key flex extension and a descriptive flex extension, the key flex extension and descriptive flex extension needs to be specified in different input blocks. This is because different type of extensions can be associated with different templates, and each template can tell the extender the meaning of and the role played by different elements or blocks in the input specification. In an embodiment, a block means a full specification starting with <Fact> and ending with </Fact> or starting with <Dimension> and ending with </Dimension>.

In accordance with an embodiment, the input specifications are in a complete form for specifying the extensions. For example, if the revenue fact has three key flex extensions and two descriptive flex extensions, all five extensions can be provided. The three key flex specifications can be specified in one block; and, the two descriptive flex specifications are provided in another block. Filters can be specified if needed on the source ADF entities.

The input specifications for extender provide a complete definition of both the dimensions and facts. The extender can keep the internal metadata in sync with this incoming definition. For example, a new attribute can be added to a cost center dimension that already has three attributes. When the definition of this cost center dimension is sent to the extender, the input specification contains the information for all four attributes.

In accordance with an embodiment, the administration tool does not need to send the information relating to pre-defined columns to the extender. The input specification passed onto the extender can only contain the complete extension information, such as extension columns and their mappings for the dimension. The extender can identify extension columns that are no more needed and remove them from the metadata. The extender can also identify un-needed joins and filters and remove them from the interface. The extender may not drop interfaces and packages and data stores of flex dimensions no more mentioned in the input specifications.

In accordance with an embodiment, the extender can drop indexes on extension columns that are not needed. For example, if expense fact no more has a foreign key on cost center dimension, the index on the cost center foreign key is dropped.

The BI server allows users to create new flex based dimensions. The following Listing 8 is a sample XML file for supporting Key Flex dimension creation in a data warehouse in accordance with an embodiment.

this information to update the Logical, Physical and ETL metadata for the repository model.

Listing 8

```
<Dimension>
  <object name= "W_COST_CENTER_D" type= "KeyFlexExtensionStandard" container= "Admin:Extension" />
  <columns>
    <column name= "HEADCOUNT" type= "Attribute"        datatype= "Varchar2(10)" />
    <column name= "SEGMENT_LOV_ID" type= "Atribute" datatype= "Varchar2(50)" />
    <column name= "SEGMENT_VAL_CODE" type= "Atribute" datatype= "Varchar2(50)" />
    <column name= "COST_CENTER_CODE" type= "Atribute" datatype= "Varchar2(40)" />
    <column name= "COST_CENTER_NAME" type= "Atribute" datatype= "Varchar2(40)" />
    <column name= "VALUE_SET_ID" type= "Atribute" datatype= "Varchar2(40)" />
    <column name= "STRIPE_COLUMN" type= "Atribute" datatype= "Varchar2(40)" />
  </columns>
 <sourceobjects>
 <sourceobject>
    <object name= "ADFV01" type= "01tp" dbtype= "ADFV0" container= "Admin:Extension" />
    <dataobjectaliases>
       <dataobjectaliases name= "ADFV01" >
    </dataobjectaliases>
    <columns>
      <column name= "HEADCOUNT" type= "Attribute"        datatype= "Varchar2(10)" />
      <column name= "DEPTH0_CODE" type= "Atribute" datatype= "Varchar2(50)" />
      <column name= "DEPTH0_VSC" type= "Atribute" datatype= "Varchar2(50)" />
      <column name= "COST_CENTER_CODE" type= "Atribute" datatype= "Varchar2(40)" />
      <column name= "VALUE_SET_ID" type= "Atribute" datatype= "Varchar2(40)" />
      <column name= "STRIPE_COLUMN" type= "Atribute" datatype= "Varchar2(40)" />
      <column name= "CREATED_BY_ID" type= "Atribute" datatype= "Varchar2(40)" />
      <column name= "UPDATED_BY_ID" type= "Atribute" datatype= "Varchar2(40)" />
      <column name= "LAST_UPDATE_DATE" type= "LastUpdateDate" datatype= "Date" />
    </columns>
 </sourceobject>
 <sourceobject>
    <object name= "ADFV02" type= "01tp" dbtype= "ADFV0" container= "Admin:Extension" />
    <dataobjectaliases>
       <dataobjectaliases name= "ADFV02" >
    </dataobjectaliases>
    <columns>
     <column name= "COST_CENTER_CODE" type= "Atribute" datatype= "Varchar2(40)" />
     <column name= "COST_CENTER_NAME" type= "Atribute" datatype= "Varchar2(40)" />
     <column name= "LAST_UPDATE_DATE" type= "LastUpdateDate" datatype= "Date" />
    </columns>
  </sourceobject>
 </sourceobjects>
 <sourcejoins>
 <sourcejoin>
 <object name= "Join.1" jointype= "Natural" joinexpression= "ADFV02 NATURAL JOIN ADFV01" />
  </sourcejoin>
```

As shown above, a user can model the new cost center segment in a transaction system as a cost center dimension. Neither the logical and physical dimension tables nor the ETL metadata for this dimension exists in the repository model before the extension.

Figure 5:
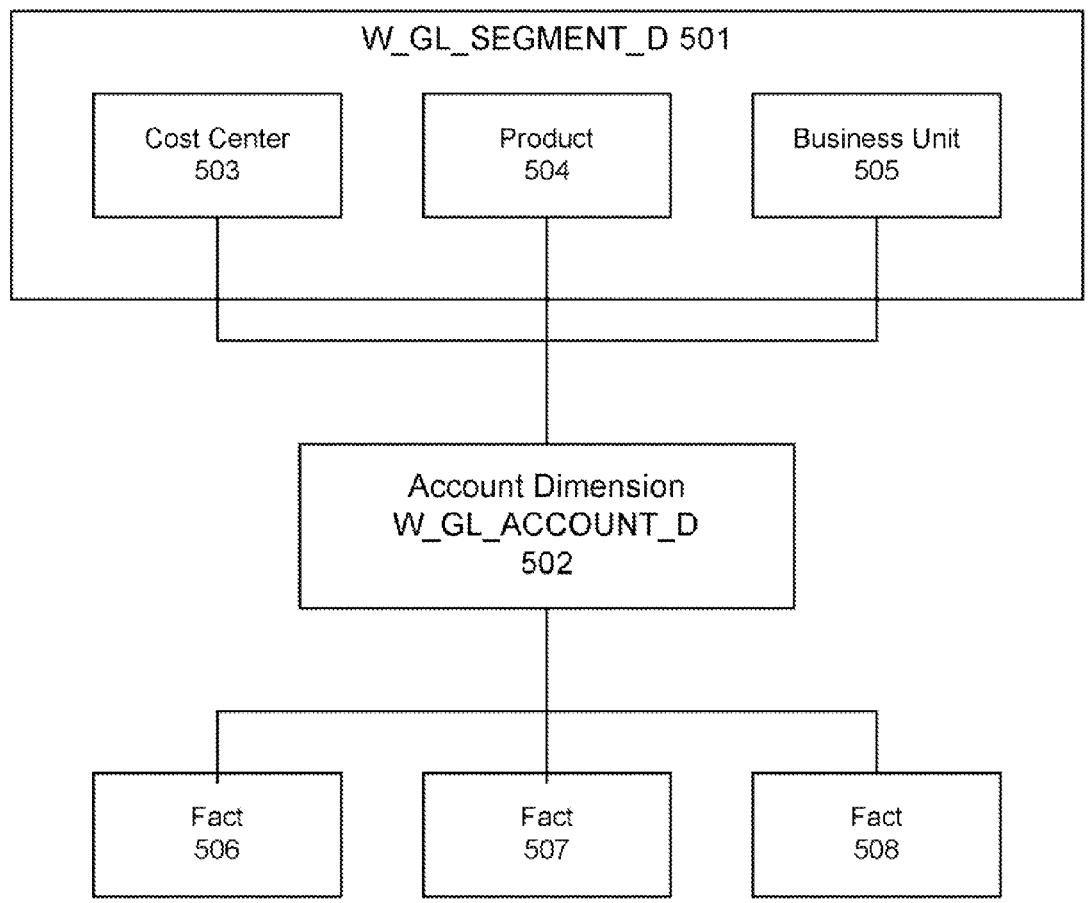
FIG. 5 illustrates an exemplary segment dimension table with pre-built columns in accordance with an embodiment.

The administration tool can have the following pieces of information: the ADF view objects involved and the required name of the physical dimension. The administration tool can then pass the extender pieces of information including dimension table properties, ADF view objects and the related properties such as column mappings, joins, and filters as shown in FIG. 5.

The extender can read in existing repository model metadata from a metadata repository (MDS), such as the physical and ETL metadata required. Extender can then create the missing pieces of metadata, using the templates for Key Flex dimension creation. The metadata elements created by the templates can include: Staging table, Extract transparent views(TVs), Extract ETL mapping, Load TVs, Load ETL mappings, and Dimension table. These metadata elements can be sent back to the administration tool, which can use this information to update the Logical, Physical and ETL metadata for the repository model.

The extender can update the new task and workflow information, as well as the dependency information, for a newly created dimension. The repository model metadata and other types of metadata can be complete for the new dimension. Then, the extender can call on the implementation module and pass in this ETL metadata. The implementation module then implements maps and creates the required tasks and workflows. Users can start the ETL process for this new dimension. Users can also modify their reports to include this new dimension.

The following Listing 9 is a sample XML file for supporting Key Flex extensions of dimensions and facts in a data warehouse in accordance with an embodiment.

Listing 9

```
<Dimension>
 <object name= "W_COST_CENTER_D"
type= "KeyFlexCreationStandard" container= "Admin:Extension" />
 <columns>
   <column name= "=DERIVE_FROM_LOOKUP"
```

Listing 9

```
type= "(=DERIVE_FROM_LOOKUP)" datatype= "Number(10,0)" />
  </columns>
  <references>
   <reference>
    <object name= "(=DERIVE_FROM_LOOKUP)" />
    <referenceparent name= "(=DERIVE_FROM_LOOKUP"
type= "(=DERIVE_FROM_LOOKUP)"
container= "(=DERIVE_FROM_LOOKUP)" />
    <referencecolumns>
     <referencecolumn childcolumn= "(=DERIVE_FROM_LOOKUP)"
parentcolumn= "ROW_WID" />
    </referencecolumns>
   </reference>
  </references>
  <lookupobjects>
   <lookupobject>
    <object name= "W_PRODUCT_D" type= "Dimension"
dbtype= "Table" container= "Admin:Extension" />
    <dataobjectaliases>
     <dataobjectaliasname= "W_PRODUCT_D" />
    </dataobjectaliases>
    <columns>
     <column name= "PRODUCT_CODE" type= "Attribute"
      datatype= "Varchar2(40)"
    </columns>
   </lookupobject>
  </lookupobjects>
  <sourceobjects>
   <sourceobject>
    <object name= "ADFV01" type= "01tp" dbtype= "ADFV0"
     container= "Admin:Extension" />
    <dataobjectaliases>
     <dataobjectalias name= "ADFV01" />
    </dataobjectaliases>
    <columns>
     <column name= "PRODUCT_CODE" type= "Attribute" datatype=
      "Varchar2(40)"
    </columns>
   </sourceobject>
  </sourceobjects>
  <lookupmappings>
   <lookupmapping>
    <object lookupobjectalias= "W_PRODUCT_D"
    lookupcolumn= "PRODUCT_CODE"
    sourceexpression= "ADFV01.PRODUCT_CODE" />
   </lookupmapping>
  </lookupmappings>
</Dimension>
```

As shown above, the logical, physical and ETL metadata exist for the concerned dimension or fact. The sample XML file describes extending existing metadata. The administration tool can pass extension information in detail. Users can create the FK on a dimension or fact. For example, Users can bring in an ADF view object segment and model it as a foreign key (FK).

In accordance with an embodiment, the Extender can read in all required pieces of repository model metadata from MDS, such as existing ETL metadata for the complete flow, which includes the process starting all the way from the source to the target dimension or fact. The existing ETL metadata can also include the extract flow into the staging table and the load flow from the staging table into the dimension or fact table. If there are post load process (PLP) facts that need to be extended, the flow into these PLP facts can be read in from MDS as well.

The Extender can then make the changes to the different metadata elements. The changed metadata elements are sent back to the administration tool. The administration tool can update the Logical, Physical and ETL metadata. Extender can pass in the extension information to implementation modules for the underlying data warehouse, which can implement the changes to the data warehouse repositories. Any needed changes can also be registered in DAC. A user can run the ETL tasks for this dimension or fact to view the extended data.

The following Listing 10 is a sample XML file for supporting Descriptive Flex extensions of dimensions and facts in a data warehouse in accordance with an embodiment.

Listing 10

```
<Dimension>
<object name= "W_COST_CENTER_D" type= "DescriptiveFlexExtensionStandard" container=
"Admin:Extension" />
<columns>
<column name= "(=DERIVE_FROM_SOURCE)" type= "(=DERIVE_FROM_SOURCE)" datatype=
"(=DERIVE_FROM_SOURCE)" />
</columns>
<sourceobjects>
<sourceobject>
<object name= "ADFV03" type= "01tp" dbtype= "ADFV0" container= "Admin:Extension" />
<dataobjectaliases>
<dataobjectalias name= "ADFV03" />
</dataobjectaliases>
<columns>
<column name= "REVENUE_CODE" type= "Attribute" datatype= "Varchar2(40)" />
<column name= "CLOSED_MARGIN" type= "Attribute" datatype= "Number(22,7)" />
</columns>
</sourceobject>
<sourceobject>
<object name= "ADFV02" type= "01tp" dbtype= "ADFV0" container= "Admin:Extension" />
<dataobjectaliases>
<dataobjectaliasname= "ADFV02" />
</dataobjectaliases>
<columns>
<column name= "COST_CENTER_CODE" type= "Attribute" datatype= "Varchar2(40)" />
</columns>
</sourceobject>
</sourceobjects>
<sourcejoins>
```

Listing 10

```
<sourcejoin>
<object name= "Join.1" jointype= "Natural" joinexpression= "ADFV02 NATURAL JOIN ADFV03" />
</sourcejoin>
</sourcejoins>
<columnmappings>
<columnmapping>
<object targetcolumn= "REVENUE_CODE" sourceexpression= "ADFV03.REVENUE_CODE" />
</columnmapping>
<columnmapping>
<object targetcolumn= "CLOSED_MARGIN" sourceexpression= "ADFV03.CLOSED_MARGIN" />
</columnmapping>
</columnmappings>
</Dimension>
```

In the example as shown above, the dimension or fact already exists. The ETL metadata for the dimension or fact exists as well.

Similar to the key flex extension case, extender can read in all required pieces of metadata from MDS. Extender can then make all required changes to the ETL metadata. This changed metadata can be sent back to the administration tool. The administration tool then updates the repository model metadata and DAC metadata as well. Extender then passes on the ETL metadata to the implementation modules. The internal data warehouse maps can then be updated with the extension flow.

In an embodiment, there can be extensions on post load process (PLP) facts. The extender can propagate the extension changes to PLP facts if they exist and a user has chosen these facts as candidates to get the extensions.

In accordance with an embodiment, the BI server allows the extender to push the DDL changes required for extensions through a data warehouse. The DDL changes includes: creating new dimension tables or staging table, altering table such as creating columns to capture new extension columns, creating index on key flex columns and primary key columns of new flex dimensions.

Exemplary Use Cases for Generating Input Specification

FIG. 5 illustrates an exemplary segment dimension table with pre-built columns in accordance with an embodiment. As shown in FIG. 5, a segment dimension table, W_GL_SEGMENT_D 501, has pre-built columns ready for new key flex dimensions, such as Cost Center 503, Product 504, and Business Unit 505. Furthermore, one or more load maps can be pre-built for this segment dimension table, and only new extract maps need to be created when new flex dimensions are created. For example, extract map for Cost center dimension can load cost center data into Extension Columns 1, 2 and 3 in W_GL_SEGMENT_D and Product dimension can load data into Extension Columns 4, 5 and 6 in this same table. An end user can do this mapping in the administration tool.

The Account dimension, W_GL_ACCOUNT_D 502, is extended with the new flex based dimensions, such as Cost Center, Product, and Business unit. These new flex based dimensions do not have individual dimension tables for storage, since they can all store their data in the segment dimension table, W_GL_SEGMENT_D. Additionally, facts 506, 507 and 508 can have foreign key to the Account dimension, and the Account dimension is already setup with foreign key to the segment dimension.

In accordance with an embodiment, based on the cost center use case as shown in FIG. 5, the administration tool can generate different input specification for different use cases, as shown in Appendix B. It will be apparent to those skilled in the art that other types of input specification can be supported without limitation.

ETL Extender Output Document

In accordance with an embodiment, the output document generated by the extender contains the data stores created, modified or searched. The output document also contains the columns, keys and references information, which information can be used by the administration tool to make changes to the warehouse model in the repository model. Appendix C shows a sample ETL Extender Output Document.

In the ample ETL extender output document as shown in Appendix C, table ADFVO1 repeats. Additionally, the document can be built incrementally and each block in the sample ETL extender output document shows the structure to a particular extension.

The present invention may be conveniently implemented using a conventional general purpose or a specialized digital computer or microprocessor programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The code examples given are presented for purposes of illustration. It will be evident that the techniques described herein may be applied using other code languages, and with different code.

The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

Appendix A

The following is an exemplary XSL transformation that can transform the administration tool output into an extender input specification.

```xml
<?xml version="1.0" encoding="ISO-8859-1"?>
<xsl:stylesheet xmlns:xsl="http://www.w3.org/1999/XSL/Transform" version="2.0"
xmlns:xalan="http://xml.apache.org/xslt" xmlns:fn="http://www.w3.org/2003/11/xpath-functions">
<xsl:output method="xml" indent="yes" xalan:indent-amount="4"/>
<xsl:template match="/Document">
    <xsl:element name="Document">
        <xsl:if test="count(extension[./@type='Dimension']) > 0">
            <xsl:element name="Dimensions">
                <xsl:for-each select="extension[./@type='Dimension']">
                    <xsl:element name="Dimension">
                        <xsl:call-template name="extensionmatch"/>
                    </xsl:element>
                </xsl:for-each>
            </xsl:element>
        </xsl:if>
        <xsl:if test="count(extension[./@type='Fact'])> 0">
            <xsl:element name="Facts">
                <xsl:for-each select="extension[./@type='Fact']">
                    <xsl:element name="Fact">
                        <xsl:call-template name="extensionmatch"/>
                    </xsl:element>
                </xsl:for-each>
            </xsl:element>
        </xsl:if>
    </xsl:element>
</xsl:template>
<xsl:template name="extensionmatch">
    <xsl:element name="object">
        <xsl:attribute name="name"><xsl:value-of select="table/@name"/></xsl:attribute>
        <xsl:attribute name="type"><xsl:value-of select="@mode"/></xsl:attribute>
        <xsl:attribute name="container">Admin:Extension</xsl:attribute>
    </xsl:element>
    <xsl:if test="count(table/columns/column) > 0">
        <xsl:element name="columns">
            <xsl:for-each select="table/columns/column">
                <xsl:call-template name="columnmatch"/>
            </xsl:for-each>
        </xsl:element>
    </xsl:if>
    <xsl:if test="count(table/columns/column/reference) > 0">
        <xsl:call-template name="referencematch"/>
    </xsl:if>
    <xsl:if test="count(table/lineages/lineage) > 0">
        <xsl:element name="extensionobjects">
            <xsl:for-each select="table/lineages/lineage">
                <xsl:call-template name="lineagematch"/>
            </xsl:for-each>
        </xsl:element>
    </xsl:if>
    <xsl:key name="lookuptables" match="table/columns/column/reference" use="@table"/>
    <xsl:if test="count(table/columns/column/reference) > 0">
        <xsl:element name="lookupobjects">
            <xsl:for-each select="table/columns/column/reference[generate-id( ) = generate-id(key('lookuptables', @table))]">
                <xsl:call-template name="lookupobjectmatch">
                    <xsl:with-param name="lookuptable" select="@table"/>
                </xsl:call-template>
            </xsl:for-each>
        </xsl:element>
    </xsl:if>
    <xsl:key name="sourcetables" match="table/columns/column/source" use="@table"/>
    <xsl:if test="count(table/columns/column/source) > 0">
        <xsl:element name="sourceobjects">
            <xsl:for-each select="table/columns/column/source[generate-id( ) = generate-id(key('sourcetables', @table))]">
                <xsl:call-template name="sourcetablematch">
                    <xsl:with-param name="sourcetable" select="@table"/>
                </xsl:call-template>
            </xsl:for-each>
            <xsl:key name="jointables" match="table/joins/join/joincolumn" use="@table"/>
            <xsl:for-each select="table/joins/join/joincolumn[string-length(generate-id(key('sourcetables', @table))) = 0 and generate-id( ) = generate-id(key('jointables', @table))]">
                <xsl:call-template name="sourcetablematch">
                    <xsl:with-param name="sourcetable" select="@table"/>
                </xsl:call-template>
            </xsl:for-each>
        </xsl:element>
    </xsl:if>
    <xsl:if test="count(table/joins/join) > 0">
        <xsl:element name="sourcejoins">
            <xsl:for-each select="table/joins/join">
```

-continued

```
            <xsl:call-template name="joinmatch"/>
         </xsl:for-each>
      </xsl:element>
   </xsl:if>
   <xsl:if test="(count(table/columns/column/source) > 0) and (count(table/columns/column/reference) = 0)">
      <xsl:element name="columnmappings">
         <xsl:for-each select="table/columns/column/source">
            <xsl:call-template name="columnsourcematch"/>
         </xsl:for-each>
      </xsl:element>
   </xsl:if>
   <xsl:if test="count(table/columns/column/reference) > 0">
      <xsl:element name="lookupmappings">
         <xsl:for-each select="table/columns/column/reference">
            <xsl:call-template name="lookupmappingmatch"/>
         </xsl:for-each>
      </xsl:element>
   </xsl:if>
</xsl:template>
<xsl:template name="columnmatch">
   <xsl:element name="column">
      <xsl:attribute name="name"><xsl:value-of select="@name"/></xsl:attribute>
      <xsl:attribute name="type"><xsl:value-of select="@type"/></xsl:attribute>
      <xsl:attribute name="datatype"><xsl:value-of select="@datatype"/></xsl:attribute>
   </xsl:element>
</xsl:template>
<xsl:template name="lineagematch">
   <xsl:element name="extensionobject">
      <xsl:element name="object">
         <xsl:attribute name="name"><xsl:value-of select="@name"/></xsl:attribute>
         <xsl:attribute name="container">Admin:Extension</xsl:attribute>
         <xsl:attribute name="type">Fact</xsl:attribute>
      </xsl:element>
      <xsl:element name="columns">
         <xsl:element name="column">
            <xsl:attribute name="name">(=DERIVE_FROM_OBJECT_COLUMN)</xsl:attribute>
            <xsl:attribute name="type">(=DERIVE_FROM_OBJECT_COLUMN)</xsl:attribute>
            <xsl:attribute name="datatype">(=DERIVE_FROM_OBJECT_COLUMN)</xsl:attribute>
         </xsl:element>
      </xsl:element>
      <xsl:if test="count(../../columns/column/reference) > 0">
         <xsl:call-template name="lineagereferencematch"/>
      </xsl:if>
   </xsl:element>
</xsl:template>
<xsl:template name="columnsourcematch">
   <xsl:element name="columnmapping">
      <xsl:element name="object">
         <xsl:attribute name="sourceexpression"><xsl:value-of select="@table"/>.<xsl:value-of select="@column"/></xsl:attribute>
         <xsl:attribute name="targetcolumn"><xsl:value-of select="../@name"/></xsl:attribute>
      </xsl:element>
   </xsl:element>
</xsl:template>
<xsl:template name="sourcetablematch">
   <xsl:param name="sourcetable"/>
   <xsl:element name="sourceobject">
      <xsl:element name="object">
         <xsl:attribute name="name"><xsl:value-of select="$sourcetable"/></xsl:attribute>
         <xsl:attribute name="container">Admin:Extension</xsl:attribute>
         <xsl:attribute name="type">Oltp</xsl:attribute>
         <xsl:attribute name="dbtype">ADFVO</xsl:attribute>
      </xsl:element>
      <xsl:element name="dataobjectaliases">
         <xsl:element name="dataobjectalias">
            <xsl:attribute name="name"><xsl:value-of select="$sourcetable"/></xsl:attribute>
         </xsl:element>
      </xsl:element>
      <xsl:element name="columns">
         <xsl:for-each select="../../column">
            <xsl:if test="source/@table = $sourcetable">
               <xsl:element name="column">
                  <xsl:attribute name="name"><xsl:value-of select="source/@column"/></xsl:attribute>
                  <xsl:attribute name="type"><xsl:value-of select="@type"/></xsl:attribute>
                  <xsl:attribute name="datatype"><xsl:value-of select="@datatype"/></xsl:attribute>
               </xsl:element>
            </xsl:if>
         </xsl:for-each>
```

-continued

```
            <xsl:for-each select="../../../joins/join/joincolumn">
                <xsl:if test="@table = $sourcetable">
                    <xsl:call-template name="columnmatch"/>
                </xsl:if>
            </xsl:for-each>
        </xsl:element>
    </xsl:element>
</xsl:template>
<xsl:template name="joinmatch">
    <xsl:element name="sourcejoin">
        <xsl:element name="object">
            <xsl:attribute name="name"><xsl:value-of select="@name"/></xsl:attribute>
            <xsl:attribute name="jointype">Cross</xsl:attribute>
            <xsl:attribute name="joinexpression"><xsl:value-of select="joincolumn[1]/@table"/>.<xsl:value-of select="joincolumn[1]/@name"/>=<xsl:value-of select="joincolumn[2]/@table"/>.<xsl:value-of select="joincolumn[2]/@name"/></xsl:attribute>
        </xsl:element>
    </xsl:element>
</xsl:template>
<xsl:template name="referencematch">
    <xsl:element name="references">
        <xsl:element name="reference">
            <xsl:element name="object">
                <xsl:attribute name="name">(=DERIVE_FROM_LOOKUP)</xsl:attribute>
            </xsl:element>
            <xsl:element name="referenceparent">
                <xsl:attribute name="name">(=DERIVE_FROM_LOOKUP)</xsl:attribute>
                <xsl:attribute name="type">(=DERIVE_FROM_LOOKUP)</xsl:attribute>
                <xsl:attribute name="container">(=DERIVE_FROM_LOOKUP)</xsl:attribute>
            </xsl:element>
            <xsl:element name="referencecolumns">
                <xsl:element name="referencecolumn">
                    <xsl:attribute name="childcolumn">(=DERIVE_FROM_LOOKUP)</xsl:attribute>
                    <xsl:attribute name="parentcolumn">ROW_WID</xsl:attribute>
                </xsl:element>
            </xsl:element>
        </xsl:element>
    </xsl:element>
</xsl:template>
<xsl:template name="lineagereferencematch">
    <xsl:element name="references">
        <xsl:element name="reference">
            <xsl:element name="object">
                <xsl:attribute name="name">(=DERIVE_FROM_OBJECT_REFERENCE)</xsl:attribute>
            </xsl:element>
            <xsl:element name="referenceparent">
                <xsl:attribute name="name">(=DERIVE_FROM_OBJECT_REFERENCE)</xsl:attribute>
                <xsl:attribute name="type">(=DERIVE_FROM_OBJECT_REFERENCE)</xsl:attribute>
                <xsl:attribute name="container">(=DERIVE_FROM_OBJECT_REFERENCE)</xsl:attribute>
            </xsl:element>
            <xsl:element name="referencecolumns">
                <xsl:element name="referencecolumn">
                    <xsl:attribute name="childcolumn">(=DERIVE_FROM_OBJECT_REFERENCE)</xsl:attribute>
                    <xsl:attribute name="parentcolumn">(=DERIVE_FROM_OBJECT_REFERENCE)</xsl:attribute>
                </xsl:element>
            </xsl:element>
        </xsl:element>
    </xsl:element>
</xsl:template>
<xsl:template name="lookupobjectmatch">
    <xsl:param name="lookuptable"/>
    <xsl:element name="lookupobject">
        <xsl:element name="object">
            <xsl:attribute name="name"><xsl:value-of select="@table"/></xsl:attribute>
            <xsl:attribute name="type">Dimension</xsl:attribute>
            <xsl:attribute name="dbtype">Table</xsl:attribute>
            <xsl:attribute name="container">Admin:Extension</xsl:attribute>
        </xsl:element>
        <xsl:element name="dataobjectaliases">
            <xsl:element name="dataobjectalias">
                <xsl:attribute name="name"><xsl:value-of select="@table"/></xsl:attribute>
            </xsl:element>
        </xsl:element>
        <xsl:element name="columns">
            <xsl:for-each select="../../column">
                <xsl:if test="reference/@table = $lookuptable">
                    <xsl:element name="column">
                        <xsl:attribute name="name"><xsl:value-of select="reference/@column"/></xsl:attribute>
                        <xsl:attribute name="type"><xsl:value-of select="@type"/></xsl:attribute>
```

```
            <xsl:attribute name="datatype"><xsl:value-of select="@datatype"/></xsl:attribute>
          </xsl:element>
        </xsl:if>
      </xsl:for-each>
    </xsl:element>
  </xsl:element>
</xsl:template>
<xsl:template name="lookupmappingmatch">
  <xsl:element name="lookupmapping">
    <xsl:element name="object">
      <xsl:attribute name="lookupobjectalias"><xsl:value-of select="@table"/></xsl:attribute>
      <xsl:attribute name="lookupcolumn"><xsl:value-of select="@column"/></xsl:attribute>
      <xsl:attribute name="sourceexpression"><xsl:value-of select="../source/@table"/>.<xsl:value-of select="../source/@column"/></xsl:attribute>
    </xsl:element>
  </xsl:element>
</xsl:template>
</xsl:stylesheet>
```

Appendix B

The administration tool can generate different input specification for different use cases. The description of the embodiments in the following examples is based on the cost center use case as shown in FIG. 5. It will be apparent to those skilled in the art that other types of input specification can be supported without limitation.

EXAMPLE 1

In a first example, user wants to create a new "Cost Center" logical dimension, which is a key flex dimension. Additionally, the Cost Center dimension also includes a hierarchy dimension.

The user can choose to re-use segment dimension in the data warehouse as the store for this Cost Center dimension, since the dimension table W_GL_SEGMENT_D and the columns in the dimension table already exist. User maps the VO columns to existing columns of the dimension. The extender can create extract maps, while the load maps are pre-configured. The extender can also create the extract maps for the hierarchy dimension, assuming the hierarchy dimension W_GL_SEGMENT_DH and associated load maps already exist.

The following is the dimension and hierarchy input specification specified for the first example.

```
<?xml version="1.0"?>
<Document>
 <Dimensions>
  <Dimension>
   <object name="W_GL_SEGMENT_D" type="KeyFlexCreationExtract" container="Admin:Extension" />
   <columns>
    <column name="SEGMENT_LOV_ID" type="Attribute" datatype="Varchar2(50)" />
    <column name="SEGMENT_VAL_CODE" type="Attribute" datatype="Varchar2(50)" />
   </columns>
   <sourceobjects>
    <sourceobject>
     <object name="ADF_SEGMENT_VO1" type="Oltp" dbtype="ADFVO" container="Admin:Extension"/>
     <dataobjectaliases>
      <dataobjectalias name="ADF_SEGMENT_VO1" />
     </dataobjectaliases>
     <columns>
      <column name="DEPTH0_CODE" type="Attribute" datatype="Varchar2(50)" />
      <column name="DEPTH0_VSC" type="Attribute" datatype="Varchar2(50)" />
      <column name="LAST_UPDATE_DATE" type="LastUpdateDate" datatype="Date" />
     </columns>
    </sourceobject>
   </sourceobjects>
   <columnmappings>
    <columnmapping>
     <object targetcolumn="SEGMENT_LOV_ID" sourceexpression="ADF_SEGMENT_VO1.DEPTH0_VSC"/>
    </columnmapping>
    <columnmapping>
     <object targetcolumn="SEGMENT_VAL_CODE" sourceexpression="ADF_SEGMENT_VO1.DEPTH0_CODE" />
    </columnmapping>
   </columnmappings>
  </Dimension>
  <Dimension>
   <object name=" W_GL_SEGMENT_D H" type="KeyFlexHierarchyCreationExtract" container="Admin:Extension" />
   <columns>
    <column name="HIERARCHY_ID" type="Attribute" datatype="Varchar2(100)" />
    <column name="HIERARCHY_VERSION" type="Attribute" datatype="Varchar2(100)" />
    <column name="HIERARCHY_LOV_ID" type="Attribute" datatype="Varchar2(100)" />
    <column name="LEVEL0_CODE" type="Attribute" datatype="Varchar2(50)" />
```

```xml
    <column name="LEVEL0_INTEGRATION_ID" type="Attribute" datatype="Varchar2(50)" />
    <column name="LEVEL1_CODE" type="Attribute" datatype="Varchar2(50)" />
    <column name="LEVEL1_INTEGRATION_ID" type="Attribute" datatype="Varchar2(50)" />
    <column name="LEVEL2_CODE" type="Attribute" datatype="Varchar2(50)" />
    <column name="LEVEL2_INTEGRATION_ID" type="Attribute" datatype="Varchar2(50)" />
   </columns>
   <lookupobjects>
    <lookupobject>
     <object name="W_GL_SEGMENT_D" type="Dimension" dbtype="Table" container="Admin:Extension" />
      <dataobjectaliases>
       <dataobjectalias name="W_GL_SEGMENT_D" />
      </dataobjectaliases>
    </lookupobject>
   </lookupobjects>
   <sourceobjects>
    <sourceobject>
     <object name="ADF_TREE_VO1" type="Oltp" dbtype="ADFVO" container="Admin:Extension" />
      <dataobjectaliases>
       <dataobjectalias name="ADF_TREE_VO1" />
      </dataobjectaliases>
      <columns>
       <column name="TREE_CODE" type="Attribute" datatype="Varchar2(100)" />
       <column name="TREE_VERSION" type="Attribute" datatype="Varchar2(100)" />
       <column name="DEPTH0_VSC" type="Attribute" datatype="Varchar2(50)" />
       <column name="DEPTH0_CODE" type="Attribute" datatype="Varchar2(50)" />
       <column name="DEPTH1_CODE" type="Attribute" datatype="Varchar2(50)" />
       <column name="DEPTH2_CODE" type="Attribute" datatype="Varchar2(50)" />
       <column name="CREATED_BY_ID" type="Attribute" datatype="Varchar2(40)" />
       <column name="UPDATED_BY_ID" type="Attribute" datatype="Varchar2(40)" />
       <column name="LAST_UPDATE_DATE" type="LastUpdateDate" datatype="Date" />
      </columns>
    </sourceobject>
   </sourceobjects>
   <columnmappings>
    <columnmapping>
     <object targetcolumn="HIERARCHY_ID" sourceexpression="ADF_TREE_VO1.TREE_CODE" />
    </columnmapping>
    <columnmapping>
     <object targetcolumn="HIERARCHY_VERSION" sourceexpression="ADF_TREE_VO1.TREE_VERSION"/>
    </columnmapping>
    <columnmapping>
     <object targetcolumn="HIERARCHY_LOV_ID" sourceexpression="ADF_TREE_VO1.DEPTH0_VSC" />
    </columnmapping>
    <columnmapping>
     <object targetcolumn="LEVEL0_CODE" sourceexpression="ADF_TREE_VO1.DEPTH0_CODE" />
    </columnmapping>
    <columnmapping>
     <object targetcolumn="LEVEL1_CODE" sourceexpression="ADF_TREE_VO1.DEPTH1_CODE" />
    </columnmapping>
    <columnmapping>
     <object targetcolumn="LEVEL2_CODE" sourceexpression="ADF_TREE_VO1.DEPTH2_CODE" />
    </columnmapping>
   </columnmappings>
  </Dimension>
 </Dimensions>
</Document>
```

The templates to be used in the first example are KeyFlexCreationExtract and KeyFlexHierarchyCreationExtract. Since the templates are specified as extract only, load maps are not created or altered. Furthermore, column type is specified as LastUpdateDate, if incremental filter is needed on the column.

EXAMPLE 2

In a second example, a user wants to extend the Account dimension W_GL_ACCOUNT_D with additional columns. These can be new foreign keys to cost center dimension. User maps new VO columns to the existing columns in the warehouse table W_GL_ACCOUNT_D. Since this is re-using Account dimension in the data warehouse, only extract maps need to be modified, since Load maps already exist.

```xml
<?xml version="1.0"?>
<Document>
 <Dimensions>
  <Dimension>
   <object name="W_GL_ACCOUNT_D" type="DescriptiveFlexExtensionExtract" container="Admin:Extension" />
    <columns>
```

```xml
<column name="ACCOUNT_SEG1_CODE" type="Attribute" datatype="Varchar2(80)" />
<column name="ACCOUNT_SEG1_ATTRIB" type="Attribute" datatype="Varchar2(80)" />
<column name="ACCOUNT_SEG2_CODE" type="Attribute" datatype="Varchar2(80)" />
<column name="ACCOUNT_SEG2_ATTRIB" type="Attribute" datatype="Varchar2(80)" />
</columns>
<sourceobjects>
<sourceobject>
<object name="AccountingKFFPVO" type="Oltp" dbtype="ADFVO" container="Admin:Extension" />
<dataobjectaliases>
<dataobjectalias name="AccountingKFFPVO" />
</dataobjectaliases>
<columns>
<column name="COST_CENTER_CODE" type="Attribute" datatype="varchar(80)" />
<column name="COST_CENTER_VSC" type="Attribute" datatype="varchar(80)" />
<column name="PROFIT_CENTER_CODE" type="Attribute" datatype="varchar(80)" />
<column name="PROFIT_CENTER_VSC" type="Attribute" datatype="varchar(80)" />
</columns>
</sourceobject>
</sourceobjects>
<columnmappings>
<columnmapping>
<object targetcolumn="ACCOUNT_SEG1_CODE" sourceexpression="AccountingKFFPVO.COST_CENTER_CODE" />
</columnmapping>
<columnmapping>
<object targetcolumn="ACCOUNT_SEG1_ATTRIB" sourceexpression="AccountingKFFPVO.COST_CENTER_VSC" />
</columnmapping>
<columnmapping>
<object targetcolumn="ACCOUNT_SEG2_CODE" sourceexpression="AccountingKFFPVO.PROFIT_CENTER_CODE" />
</columnmapping>
<columnmapping>
<object targetcolumn="ACCOUNT_SEG2_ATTRIB" sourceexpression="AccountingKFFPVO.PROFIT_CENTER_VSC" />
</columnmapping>
</columnmappings>
</Dimension>
</Dimensions>
</Document>
```

The extended columns can contain additional descriptive attributes or key flex extensions. Even though this is really a key flex extension, the template is specified as "DescriptiveFlexExtensionExtract," since extract maps alone need to be extended.

EXAMPLE 3

In a third example, a user wants to bring in additional attributes into AP Terms dimension. This dimension does not use W_GL_SEGMENT_D. This dimension is not a flex-based dimension. This dimension has its own dimension table W_AP_TERMS_D. Since the Segment dimension is not used, both the extract maps and load maps need to be extended.

```xml
<?xml version="1.0"?>
<Document>
<Dimensions>
<Dimension>
<object name="W_AP_TERMS_D" type="DescriptiveFlexExtensionStandard" container="Admin:Extension" />
<columns>
<column name="ATTRIBUTE1" type="Attribute" datatype="Varchar2(80)" />
</columns>
<sourceobjects>
<sourceobject>
<object name="PaymentTermLinePVO" type="Oltp" dbtype="ADFVO" container="Admin:Extension" />
<dataobjectaliases>
<dataobjectalias name="PaymentTermLinePVO" />
</dataobjectaliases>
<columns>
<column name="ATTRIBUTE1" type="Attribute" datatype="varchar(80)" />
</columns>
</sourceobject>
</sourceobjects>
<columnmappings>
<columnmapping>
<object targetcolumn="ATTRIBUTE1" sourceexpression="PaymentTermLinePVO.ATTRIBUTE1" />
</columnmapping>
</columnmappings>
</Dimension>
</Dimensions>
</Document>
```

Since this is a descriptive flex extension and both extract and load maps need to be extended, the template is specified as "DescriptiveFlexExtensionStandard."

EXAMPLE 4

In a fourth example, Cost center, a key flex dimension, does not exist in the warehouse and needs to be created. Cost Center dimension also needs a hierarchy dimension created for it. Revenue fact needs to have a foreign key to this newly created cost center dimension. This foreign key does not exist in the warehouse. There can be separate input specifications: one for dimension and one for fact.

The following is the dimension input specification.

```xml
<?xml version="1.0"?>
<Document>
<Dimensions>
<Dimension>
<object name="W_COST_CENTER_D" type="KeyFlexCreationStandard" container="Admin:Extension" />
<columns>
<column name="(=DERIVE_FROM_SOURCE)" type="(=DERIVE_FROM_SOURCE)" datatype="(=DERIVE_FROM_SOURCE)" />
</columns>
<sourceobjects>
<sourceobject>
<object name="ADFVO1" type="Oltp" dbtype="ADFVO" container="Admin:Extension" />
<dataobjectaliases>
<dataobjectalias name="ADFVO1" />
</dataobjectaliases>
<columns>
<column name="COST_CENTER_CODE" type="Attribute" datatype="Varchar2(40)" />
<column name="VALUE_SET_ID" type="Attribute" datatype="Varchar2(40)" />
<column name="STRIPE_COLUMN" type="Attribute" datatype="Varchar2(40)" />
<column name="CREATED_BY_ID" type="Attribute" datatype="Varchar2(40)" />
<column name="UPDATED_BY_ID" type="Attribute" datatype="Varchar2(40)" />
<column name="LAST_UPDATE_DATE" type="Attribute" datatype="Date" />
</columns>
</sourceobject>
<sourceobject>
<object name="ADFVO2" type="Oltp" dbtype="ADFVO" container="Admin:Extension" />
<dataobjectaliases>
<dataobjectalias name="ADFVO2" />
</dataobjectaliases>
<columns>
<column name="COST_CENTER_CODE" type="Attribute" datatype="Varchar2(40)" />
<column name="COST_CENTER_NAME" type="Attribute" datatype="Varchar2(40)" />
<column name="LAST_UPDATE_DATE" type="Attribute" datatype="Date" />
</columns>
</sourceobject>
</sourceobjects>
<sourcejoins>
<sourcejoin>
<object name="Join.1" jointype="Natural" joinexpression="ADFVO2 NATURAL JOIN ADFVO1" />
</sourcejoin>
</sourcejoins>
<columnmappings>
<columnmapping>
<object targetcolumn="STRIPE_COLUMN" sourceexpression="'Cost Center'" />
</columnmapping>
<columnmapping>
<object targetcolumn="INTEGRATION_ID" sourceexpression="ADFVO1.COST_CENTER_CODE||'~'||ADFVO1.VALUE_SET_ID" />
</columnmapping>
<columnmapping>
<object targetcolumn="(=DERIVE_FROM_SOURCE)" sourceexpression="(=DERIVE_FROM_SOURCE)" />
</columnmapping>
</columnmappings>
</Dimension>
<Dimension>
<object name="W_COST_CENTER_DH" type="KeyFlexHierarchyCreationStandard" container="Admin:Extension" />
<columns>
<column name="(=DERIVE_FROM_SOURCE)" type="(=DERIVE_FROM_SOURCE)" datatype="(=DERIVE_FROM_SOURCE)" />
</columns>
<lookupobjects>
<lookupobject>
<object name="W_COST_CENTER_D" type="Dimension" dbtype="Table" container="Admin:Extension" />
<dataobjectaliases>
<dataobjectalias name="W_COST_CENTER_D" />
</dataobjectaliases>
<columns>
<column name="COST_CENTER_CODE" type="Attribute" datatype="Varchar2(40)" />
</columns>
</lookupobject>
</lookupobjects>
<sourceobjects>
<sourceobject>
<object name="ADFVO1_H" type="Oltp" dbtype="ADFVO" container="Admin:Extension" />
<dataobjectaliases>
<dataobjectalias name="ADFVO1_H" />
</dataobjectaliases>
```

```
<columns>
  <column name="COST_CENTER_CODE" type="Attribute" datatype="Varchar2(40)" />
  <column name="HIERARCHY_NAME" type="Attribute" datatype="Varchar2(40)" />
  <column name="STRIPE_COLUMN" type="Attribute" datatype="Varchar2(40)" />
  <column name="CHILD_COST_CENTER" type="Attribute" datatype="Varchar2(40)" />
  <column name="PARENT_COST_CENTER" type="Attribute" datatype="Varchar2(40)" />
  <column name="CREATED_BY_ID" type="Attribute" datatype="Varchar2(40)" />
  <column name="UPDATED_BY_ID" type="Attribute" datatype="Varchar2(40)" />
  <column name="LAST_UPDATE_DATE" type="Attribute" datatype="Date" />
</columns>
</sourceobject>
<sourceobject>
  <object name="ADFVO2" type="Oltp" dbtype="ADFVO" container="Admin:Extension" />
  <dataobjectaliases>
    <dataobjectalias name="ADFVO2" />
  </dataobjectaliases>
  <columns>
    <column name="COST_CENTER_CODE" type="Attribute" datatype="Varchar2(40)" />
    <column name="LAST_UPDATE_DATE" type="Attribute" datatype="Date" />
  </columns>
</sourceobject>
</sourceobjects>
<sourcejoins>
  <sourcejoin>
    <object name="Join.1" jointype="Natural" joinexpression="ADFVO2 NATURAL JOIN ADFVO1_H" />
  </sourcejoin>
</sourcejoins>
<columnmappings>
  <columnmapping>
    <object targetcolumn="STRIPE_COLUMN" sourceexpression="'Cost Center'" />
  </columnmapping>
  <columnmapping>
    <object targetcolumn="INTEGRATION_ID" sourceexpression="ADFVO1_H.COST_CENTER_CODE||'.'||ADFVO1_H.HIERARCHY_NAME" />
  </columnmapping>
  <columnmapping>
    <object targetcolumn="(=DERIVE_FROM_SOURCE)" sourceexpression="(=DERIVE_FROM_SOURCE)" />
  </columnmapping>
</columnmappings>
</Dimension>
</Dimensions>
</Document>
```

In the dimension input specification, the extension type is specified as "KeyFlexCreationStandard". The extender can then apply the creation template on this incoming specification and generate the metadata changes required. Here, different ADF objects, for example ADFVO1 and ADFVO2, can be specified in the dimension creation specification inputs for different purposes: as column mappings; as joins; and as filters.

If a join is "ADFVO1.cost_center_code=ADFVO2.cost_center_code" and cost_center_code is not specified as a column for ADFVO1 or ADFVO2, then the extender can throw an error when processing the dimension creation specification inputs. The same principle applies to column mappings and filters as well. All the columns mentioned in joins, filters and column mappings can be explicitly mentioned in the <columns> section for the ADF object.

In one embodiment, the column mapping can be implicitly specified as "<objecttargetcolumn="(=DERIVE_FROM_SOURCE)" sourceexpression="(=DERIVE_FROM_SOURCE)"/>."

The administration tool may need to specify the columns that contribute data to the dimension, even though ADFVO1 and ADFVO2 can have many more columns.

Also, the dimension can have an associated Hierarchy dimension specified in "KeyFlexHierarchyCreationStandard". The base dimension W_COST_CENTER_D can be specified as a lookup object. The extension type is specified as "KeyFlexExtensionStandard". This means that the extension is a foreign key extension on the fact and the source data for this foreign key column comes all the way from the source ADF VO objects. This is in contrast to "KeyFlexExtensionPushDown" where the foreign key data comes from an existing dimension lookup.

The following is the fact input specification.

```
<?xml version="1.0"?>
<Document>
  <Facts>
    <Fact>
      <object name="W_GL_REVN_F" type="KeyFlexExtensionStandard" container="Admin:Extension" />
      <columns>
        <column name="(=DERIVE_FROM_LOOKUP)" type="(=DERIVE_FROM_LOOKUP)" datatype="Number(10,0)" />
      </columns>
      <references>
        <reference>
```

```
    <object name="(=DERIVE_FROM_LOOKUP)" />
    <referenceparent name="(=DERIVE_FROM_LOOKUP)" type="(=DERIVE_FROM_LOOKUP)"
container="(=DERIVE_FROM_LOOKUP)" />
    <referencecolumns>
     <referencecolumn childcolumn="(=DERIVE_FROM_LOOKUP)" parentcolumn="ROW_WID" />
    </referencecolumns>
   </reference>
  </references>
  <extensionobjects>
   <extensionobject>
    <object name="W_GL_REVN_GRPACCT_DAY_A" type="Fact" dbtype="Table"
container="Admin:Extension" />
    <columns>
     <column name="(=DERIVE_FROM_OBJECT_COLUMN)" type="(=DERIVE_FROM_OBJECT_COLUMN)"
datatype="(=DERIVE_FROM_OBJECT_COLUMN)" />
    </columns>
    <references>
     <reference>
      <object name="(=DERIVE_FROM_OBJECT_REFERENCE)" />
      <referenceparent name="(=DERIVE_FROM_OBJECT_REFERENCE)"
type="(=DERIVE_FROM_OBJECT_REFERENCE)" container="(=DERIVE_FROM_OBJECT_REFERENCE)" />
      <referencecolumns>
       <referencecolumn childcolumn="(=DERIVE_FROM_OBJECT_REFERENCE)"
parentcolumn="(=DERIVE_FROM_OBJECT_REFERENCE)" />
      </referencecolumns>
     </reference>
    </references>
   </extensionobject>
  </extensionobjects>
  <lookupobjects>
   <lookupobject>
    <object name="W_COST_CENTER_D" type="Dimension" dbtype="Table"
container="Admin:Extension" />
    <dataobjectaliases>
     <dataobjectalias name="W_COST_CENTER_D" />
    </dataobjectaliases>
    <columns>
     <column name="COST_CENTER_CODE" type="Attribute" datatype="Varchar2(40)" />
    </columns>
   </lookupobject>
  </lookupobjects>
  <sourceobjects>
   <sourceobject>
    <object name="ADF_REVENUE_VO" type="Oltp" dbtype="ADFVO" container="Admin:Extension" />
    <dataobjectaliases>
     <dataobjectalias name="ADF_REVENUE_VO" />
    </dataobjectaliases>
    <columns>
     <column name="CCC_ID" type="Attribute" datatype="Varchar2(40)" />
    </columns>
   </sourceobject>
   <sourceobject>
    <object name="ADF_FLEX_VO" type="Oltp" dbtype="ADFVO" container="Admin:Extension" />
    <dataobjectaliases>
     <dataobjectalias name="ADF_FLEX_VO" />
    </dataobjectaliases>
    <columns>
     <column name="CCC_ID" type="Attribute" datatype="Varchar2(40)" />
     <column name="COST_CENTER_ID" type="Attribute" datatype="Varchar2(40)" />
    </columns>
   </sourceobject>
   <sourceobject>
    <object name="RA_CUSTOMER_TRX_ALL" type="Oltp" dbtype="ADFVO"
container="Admin:Extension" />
    <dataobjectaliases>
     <dataobjectalias name="RA_CUSTOMER_TRX_ALL" />
    </dataobjectaliases>
    <columns>
     <column name="REASON_CODE" type="Attribute" datatype="Varchar2(30)" />
    </columns>
   </sourceobject>
  </sourceobjects>
  <sourcejoins>
   <sourcejoin>
    <object name="Join.1" jointype="Normal"
joinexpression="ADF_FLEX_VO.CCC_ID=ADF_REVENUE_VO.CCC_ID" />
   </sourcejoin>
   <sourcejoin>
    <object name="Join.2" jointype="Normal"
```

```
joinexpression="ADF_FLEX_VO.CCC_ID=RA_CUSTOMER_TRX_ALL.REASON_CODE" />
    </sourcejoin>
  </sourcejoins>
  <lookupmappings>
    <lookupmapping>
    <object lookupobjectalias="W_COST_CENTER_D" lookupcolumn="COST_CENTER_CODE"
sourceexpression="ADF_FLEX_VO.COST_CENTER_ID" />
    </lookupmapping>
  </lookupmappings>
 </Fact>
 </Facts>
 </Document>
```

In the above fact input, other than the base fact, there are extension objects specified as "<extensionobject>". These are the PLP facts, the derived and aggregate facts that get their data off the base fact.

In this example, the data flow can be as following.

W_GL_REVN_F ⇒ W_GL_REVN_GRPACCOUNT_A_TMP ⇒ W_GL_REVN_GRPACCT_DAY_A

In one embodiment, the input specification from the administration tool only specifies the PLP facts and not the intermediate tables. In the above example, an intermediate table, W_GL_REVN_GRPACCOUNT_A_TMP, is not specified in the input specification. The intermediate tables are taken care of by the extender.

Furthermore, a lookup object is specified for a foreign key in the above example. The foreign key is to cost center dimension and so, the cost center dimension is specified as the lookup object.

In one embodiment, there can be both column mapping and lookup mapping specified in the input specification. The "<columnmapping>" tag implies that the data is pulled into the dimension or fact or derived/aggregate facts as specified in the source expression. The "<lookupmapping>" tag implies that the data is used to lookup the dimension to get the surrogate key. The fact foreign key is eventually loaded with the surrogate key from the dimension lookup.

Additionally, if the ADF columns appearing in the lookup mappings or column mappings or joins or filters are not specified along with the ADF object, the ETL extender can throw an error.

In one embodiment, there can be a "<reference>" tag in the input specification. Since this is a foreign key based extension, references can be created for the fact, pointing to the parent dimension.

EXAMPLE 5

In the fifth example, descriptive flex extensions are performed. The key flex part is the same as the previous examples, which shows the full specification when the extension specification is sent down to the ETL extender.

The following is the fact input specification.

```
<Facts>
  <Fact>
    <object name="W_GL_REVN_F" type="KeyFlexExtensionStandard" container="Admin:Extension" />
    .... The key flex extension specification is same as the previous example
  </Fact>
  <Fact>
    <object name="W_GL_REVN_F" type="DescriptiveFlexExtensionStandard"
container="Admin:Extension" />
    <columns>
      <column name="(=DERIVE_FROM_SOURCE)" type="(=DERIVE_FROM_SOURCE)"
datatype="(=DERIVE_FROM_SOURCE)" />
    </columns>
    <extensionobjects>
      <extensionobject>
      <object name="W_GL_REVN_GRPACCT_DAY_A" type="Fact" dbtype="Table"
container="Admin:Extension" />
      <columns>
        <column name="(=DERIVE_FROM_OBJECT_COLUMN)" type="(=DERIVE_FROM_OBJECT_COLUMN)"
datatype="(=DERIVE_FROM_OBJECT_COLUMN)" />
      </columns>
      </extensionobject>
    </extensionobjects>
    <sourceobjects>
      <sourceobject>
      <object name="ADF_REVENUE_VO" type="Oltp" dbtype="ADFVO" container="Admin:Extension" />
      <dataobjectaliases>
        <dataobjectalias name="ADF_REVENUE_VO" />
      </dataobjectaliases>
      <columns>
        <column name="CCC_ID" type="Attribute" datatype="Varchar2(40)" />
        <column name="REVENUE_CODE" type="Attribute" datatype="Varchar2(40)" />
        <column name="CLOSED_MARGIN" type="Attribute" datatype="Number(22,7)" />
      </columns>
      </sourceobject>
      <sourceobject>
      <object name="ADF_COST_VO" type="Oltp" dbtype="ADFVO" container="Admin:Extension" />
      <dataobjectaliases>
```

```xml
    <dataobjectalias name="ADF_COST_VO" />
   </dataobjectaliases>
   <columns>
    <column name="CCC_ID" type="Attribute" datatype="Varchar2(40)" />
    <column name="COST_CODE" type="Attribute" datatype="Varchar2(40)" />
   </columns>
  </sourceobject>
  <sourceobject>
   <object name="ADF_FLEX_VO" type="Oltp" dbtype="ADFVO" container="Admin:Extension" />
   <dataobjectaliases>
    <dataobjectalias name="ADF_FLEX_VO" />
   </dataobjectaliases>
   <columns>
    <column name="CCC_ID" type="Attribute" datatype="Varchar2(40)" />
   </columns>
  </sourceobject>
  <sourceobject>
   <object name="RA_CUSTOMER_TRX_ALL" type="Oltp" dbtype="ADFVO" container="Admin:Extension" />
   <dataobjectaliases>
    <dataobjectalias name="RA_CUSTOMER_TRX_ALL" />
   </dataobjectaliases>
   <columns>
    <column name="REASON_CODE" type="Attribute" datatype="Varchar2(30)" />
   </columns>
  </sourceobject>
 </sourceobjects>
 <sourcejoins>
  <sourcejoin>
   <object name="Join.1" jointype="Normal" joinexpression="ADF_FLEX_VO.CCC_ID=ADF_REVENUE_VO.CCC_ID" />
  </sourcejoin>
  <sourcejoin>
   <object name="Join.2" jointype="Normal" joinexpression="ADF_FLEX_VO.CCC_ID=ADF_COST_VO.CCC_ID" />
  </sourcejoin>
  <sourcejoin>
   <object name="Join.3" jointype="Normal" joinexpression="ADF_FLEX_VO.CCC_ID=RA_CUSTOMER_TRX_ALL.REASON_CODE" />
  </sourcejoin>
 </sourcejoins>
 <columnmappings>
  <columnmapping>
   <object targetcolumn="REVENUE_CODE" sourceexpression="ADF_REVENUE_VO.REVENUE_CODE" />
  </columnmapping>
  <columnmapping>
   <object targetcolumn="CLOSED_MARGIN" sourceexpression="ADF_REVENUE_VO.CLOSED_MARGIN" />
  </columnmapping>
  <columnmapping>
   <object targetcolumn="COST_CODE" sourceexpression="ADF_COST_VO.COST_CODE" />
  </columnmapping>
 </columnmappings>
 </Fact>
</Facts>
</Document>
```

The descriptive flex extension can be specified separately from the key flex extensions. ETL extender can apply different templates for key flex extensions vs. descriptive flex extensions.

The join "ADF_FLEX_VO.CCC_ID=ADF_REVENUE_VO.CCC_ID" repeats in the key flex specification and the descriptive flex specification. Each extension block is complete specification. In the descriptive flex case, there can be three ADF objects and one existing object: ADF_FLEX_VO; ADF_REVENUE_VO; ADF_COST_VO; RA_CUSTOMER_TRX_ALL.

The joins between all four of them can be specified. Here, since the existing map for the fact contains only RA_CUSTOMER_TRX_ALL, the join to RA_CUSTOMER_TRX_ALL can be shown. And, all the objects can be present in joins.

EXAMPLE 6

In the sixth example, a key push down extension is performed on the GL Revenue fact.

The following is the fact input specification.

```xml
<?xml version="1.0"?>
<Document>
 <Facts>
  <Fact>
   <object name=" W_GL_REVN_F " type="KeyFlexStandard" container="Admin:PackagedWH" />
```

```
.... The key flex extension specification as before
</Fact>
<Fact>
 <object name="W_GL_REVN_F" type="KeyFlexExtensionPushDown" container="Admin:Extension" />
 <columns>
  <column name="(=DERIVE_FROM_LOOKUP)" type="(=DERIVE_FROM_LOOKUP)" datatype="Number(10,0)" />
 </columns>
 <references>
  <reference>
   <object name="W_PRODUCT_D" />
   <referenceparent name="W_PRODUCT_D" type="Dimension" container="Admin:Extension" />
   <referencecolumns>
    <referencecolumn childcolumn="PRODUCT_CODE" parentcolumn="ROW_WID" />
   </referencecolumns>
  </reference>
 </references>
 <extensionobjects>
  <extensionobject>
   <object name="W_GL_REVN_GRPACCT_DAY_A" type="Fact" dbtype="Table" container="Admin:Extension" />
   <columns>
    <column name="(=DERIVE_FROM_OBJECT_COLUMN)" type="(=DERIVE_FROM_OBJECT_COLUMN)" datatype="(=DERIVE_FROM_OBJECT_COLUMN)" />
   </columns>
   <references>
    <reference>
     <object name="(=DERIVE_FROM_OBJECT_REFERENCE)" />
     <referenceparent name="(=DERIVE_FROM_OBJECT_REFERENCE)" type="(=DERIVE_FROM_OBJECT_REFERENCE)" container="(=DERIVE_FROM_OBJECT_REFERENCE)" />
     <referencecolumns>
      <referencecolumn childcolumn="(=DERIVE_FROM_OBJECT_REFERENCE)" parentcolumn="(=DERIVE_FROM_OBJECT_REFERENCE)" />
     </referencecolumns>
    </reference>
   </references>
  </extensionobject>
 </extensionobjects>
 <lookupobjects>
  <lookupobject>
   <object name="W_COST_CENTER_D" type="Dimension" dbtype="Table" container="Admin:Extension" />
   <dataobjectaliases>
    <dataobjectalias name="W_COST_CENTER_D" />
   </dataobjectaliases>
   <columns>
    <column name="PRODUCT_CODE" type="Attribute" datatype="Number(10,0)" />
   </columns>
  </lookupobject>
 </lookupobjects>
</Fact>
</Facts>
</Document>
```

The specification can indicate that the product foreign key, which is already in the cost center dimension, can be pushed down from the cost center dimension.

In one embodiment, pushdown key flex extension and standard key flex extension cannot be mixed since different templates are involved here. Pushdown extension has two components. One is the reference and the other is the lookup. The reference in this example is the product dimension and the lookup is on the cost center dimension. This is specification to the extender that the foreign key needs to be created to the product dimension and the source for this foreign key comes from cost center dimension and column "PRODUCT_CODE".

Additionally, there are extension objects or PLP objects specified that need the product key. Furthermore, ADF objects are not involved in this extension since the data comes as a push down from a dimension.

Appendix C

The following is an sample ETL Extender Output Document

What is claimed is:

1. A method for supporting data flexibility in a business intelligence (BI) server associated with a data warehouse, comprising:

providing an extender associated with a data warehouse, wherein the extender is implemented in Java and wrapped by a remote service, and communicates with an administration tool on the BI server through a Java host;

providing, from the extender, data flow information to the administration tool, wherein the data flow information includes dependencies between target tables in the data warehouse, and specifies mapping relationships between a plurality of source data objects and the target tables in the data warehouse;

receiving, from the administration tool, an input extension specification that includes one or more changes in the source data object, and one or more target tables to be extended using the one or more changes, wherein the input extension specification is constructed by the administration tool based on the one or more changes and the data flow information, wherein the extender receives the input extension specification as values of a plurality of input parameters of a function call from a Java client, which forwards the function call from the Java host in response to the administration tool making a call to the remote service through the Java host;
retrieving, via the extender, a metadata for a repository model of the data warehouse, and an extract, transform and load (ETL) metadata for the data warehouse, from a metadata server associated with the BI server;
extending the ETL metadata using the input extension specification and the metadata for the repository model of the data warehouse;
invoking, via the extender, an implementation module specific to the data warehouse to extend the one or more target tables in accordance with the extended ETL metadata;
generating, by the extender, an output document that contains information on tables created, modified, or searched in the data warehouse by the implementation module, and information on columns, keys and references associated with the tables created, modified or searched; and
providing the output document to the administration tool, wherein the output document is configured to be used by the administration tool to modify the repository model of the data warehouse stored in the metadata service.

2. The method according to claim 1, wherein the data flow is generated by the extender that
receives a source data store document, and tracks data flows from source data objects defined in the source data store document towards one or more target tables in the data warehouse, or
receives a data warehouse document, and obtains data flow from one or more source data objects that result in a particular target table defined in the data warehouse document.

3. The method according to claim 1, wherein the data flow information is represented in an XML file.

4. The method according to claim 1, wherein the input extension specification specifies information on one or more dimensions before specifying information on one or more facts in physical repositories associated with the one or more target tables.

5. The method according to claim 1, wherein the input extension specification separates specifications for key and descriptive flex associated with the one or more table tables.

6. The method according to claim 1, further comprising:
using the input extension specification to perform at least one of:
creating a new flex based dimension,
creating a new foreign key on a dimension,
providing a fact with a new foreign key to a dimension,
providing a fact with new attributes, and
propagating extension changes to post load process facts.

7. The method according to claim 1, further comprising:
using a container-mapping configuration to restrict a scope of extension to the particular warehouse.

8. A system for providing data flexibility in a business intelligence server (BI) associated with a data warehouse, comprising:
one or more microprocessors;
an administration tool on the BI server, running on the one or more microprocessors,
an extender associated with the data warehouse, wherein the extender is implemented in Java and wrapped by a remote service, and communicates with an administration tool on the BI server through a Java host, and wherein the extender operates to
provide data flow information to the administration tool, wherein the data flow information includes dependencies between target tables in the data warehouse and, and specifies mapping relationships between a plurality of source data objects and the target tables in the data warehouse;
receive, from the administration tool, an input extension specification that includes one or more changes in the source data object, and one or more target tables to be extended using the one or more changes, wherein the input extension specification is constructed by the administration tool based on the one or more changes and the data flow information, wherein the extender receives the input extension specification as values of a plurality of input parameters of a function call from a Java client, which forwards the function call from the Java host in response to the administration tool making a call to the remote service through the Java host;
retrieve, via the extender, a metadata for a repository model of the data warehouse, and an extract, transform and load (ETL) metadata for the data warehouse, from a metadata server associated with the BI server;
extend the ETL metadata using the input extension specification and the metadata for the repository model of the data warehouse;
invoke, via the extender, an implementation module specific to the data warehouse to extend the one or more target tables in accordance with the extended ETL metadata;
generate, by the extender, an output document that contains information on tables created, modified, or searched in the data warehouse by the implementation module, and information on columns, keys and references associated with the tables created, modified or searched; and
provide the output document to the administration tool, wherein the output document is configured to be used by the administration tool to modify the repository model of the data warehouse stored in the metadata service.

9. The system according to claim 8, wherein the data flow information is generated by the extender that receives a source data store document, and tracks data flows from source data objects defined in the source data store document towards one or more target tables in the data warehouse, or receives a data warehouse document, and obtains data flow from one or more source data objects that result in a particular target table defined in the data warehouse document.

10. The system according to claim 8, wherein the data flow information is represented in an XML file.

11. The system according to claim 8, wherein the input extension specification specifies—information on one or more dimensions before specifying information on one or more facts in physical repositories associated with the one or more target tables.

12. The system according to claim 8, wherein the input extension specification separates specifications for key and descriptive flex associated with the one or more table tables.

13. The system according to claim 8, further comprising: using the input extension specification to perform at least one of: creating a new flex based dimension, creating a new foreign key on a dimension, providing a fact with a new foreign key to a dimension, providing a fact with new attributes, and propagating extension changes to post load process facts.

14. A non-transitory machine readable storage medium having instructions stored thereon that when executed cause a system to perform the steps comprising:

providing an extender associated with a data warehouse, wherein the extender is implemented in Java and wrapped by a remote service, and communicates with an administration tool on the BI server through a Java host;

providing, from the extender, data flow information to the administration tool, wherein the data flow information includes dependencies between target tables in the data warehouse and, and specifies mapping relationships between a plurality of source data objects and the target tables in the data warehouse;

receiving, from the administration tool, an input extension specification that includes one or more changes in the source data object, and one or more target tables to be extended using the one or more changes, wherein the input extension specification is constructed by the administration tool based on the one or more changes and the data flow information, wherein the extender receives the input extension specification as values of a plurality of input parameters of a function call from a Java client, which forwards the function call from the Java host in response to the administration tool making a call to the remote service through the Java host;

retrieving, via the extender, a metadata for a repository model of the data warehouse, and an extract, transform and load (ETL) metadata for the data warehouse, from a metadata server associated with the BI server;

extending the ETL metadata using the input extension specification and the metadata for the repository model of the data warehouse;

invoking, via the extender, an implementation module specific to the data warehouse to extend the one or more target tables in accordance with the extended ETL metadata;

generating, by the extender, an output document that contains information on tables created, modified, or searched in the data warehouse by the implementation module, and information on columns, keys and references associated with the tables created, modified or searched; and providing the output document to the administration tool, wherein the output document is configured to be used by the administration tool to modify the repository model of the data warehouse stored in the metadata service.

15. The non-transitory machine readable storage medium according to claim 14, wherein the data flow information is generated by the extender that receives a source data store document, and tracks data flows from source data objects defined in the source data store document towards one or more target tables in the data warehouse, or receives a data warehouse document, and obtains data flow from one or more source data objects that result in a particular target table defined in the data warehouse document.

16. The non-transitory machine readable storage medium according to claim 14, wherein the data flow information is represented in an XML file.

17. The non-transitory machine readable storage medium of claim 14, wherein the input extension specification specifies information on one or more dimensions before specifying information on one or more facts in physical repositories associated with the one or more target tables.

18. The non-transitory machine readable storage medium according to claim 14, wherein the input extension specification separates specifications for key and descriptive flex associated with the one or more table tables.

19. The non-transitory machine readable storage medium according to claim 14, further comprising:

using the input extension specification to perform at least one of:

creating a new flex based dimension, creating a new foreign key on a dimension, providing a fact with a new foreign key to a dimension, providing a fact with new attributes, and propagating extension changes to post load process facts.

20. The non-transitory machine readable storage medium according to claim 14, further comprising using a container-mapping configuration to restrict a scope of extension to the particular warehouse.

* * * * *